United States Patent
Nitzan

(10) Patent No.: US 11,562,093 B2
(45) Date of Patent: Jan. 24, 2023

(54) SYSTEM FOR GENERATING AN ELECTRONIC SECURITY POLICY FOR A FILE FORMAT TYPE

(71) Applicant: Forcepoint, LLC, Austin, TX (US)

(72) Inventor: Amit Nitzan, Tel Aviv (IL)

(73) Assignee: Forcepoint LLC, Austin, TX (US)

( * ) Notice: Subject to any disclaimer, the term of this patent is extended or adjusted under 35 U.S.C. 154(b) by 758 days.

(21) Appl. No.: 16/293,949

(22) Filed: Mar. 6, 2019

(65) Prior Publication Data

US 2020/0285764 A1    Sep. 10, 2020

(51) Int. Cl.
 *G06F 21/00* (2013.01)
 *G06F 21/62* (2013.01)
 *G06F 16/11* (2019.01)

(52) U.S. Cl.
 CPC ........ *G06F 21/6227* (2013.01); *G06F 16/116* (2019.01)

(58) Field of Classification Search
 None
 See application file for complete search history.

(56) References Cited

U.S. PATENT DOCUMENTS

| | | |
|---|---|---|
| 6,907,531 B1 | 6/2005 | Dodd et al. |
| 7,559,080 B2 * | 7/2009 | Bhargavan .............. H04L 63/08 713/151 |
| 7,574,740 B1 | 8/2009 | Kennis |
| 7,865,484 B2 * | 1/2011 | Wilson ............... H04N 1/32133 707/694 |
| 7,882,538 B1 | 2/2011 | Palmer |
| 8,201,244 B2 * | 6/2012 | Sun ........................ G06F 21/566 726/22 |
| 3,230,505 A1 | 7/2012 | Ahrens et al. |
| 8,332,909 B2 * | 12/2012 | Chatterjee ............. G06F 21/126 726/1 |
| 10,200,314 B1 * | 2/2019 | Karp ................. G06F 16/90332 |

(Continued)

OTHER PUBLICATIONS symantec.com, Which tuning is available for improving the performance of Symantec Endpoint Protection clients during scan, https://support.symantec.com/en_US/article.TECH143941.html, Jan. 6, 2011.

(Continued)

*Primary Examiner* — Maung T Lwin
(74) *Attorney, Agent, or Firm* — Terrile, Cannatti & Chambers; Stephen A. Terrile

(57) ABSTRACT

A method, system, and computer-readable storage medium are disclosed for identifying binary signatures in a selected set of files and assigning at least one of the binary signatures to a file format name or file format type for use in a security policy generator. In certain embodiments, the method for generating an electronic security policy for a file format type, includes: identification of a plurality of files stored in electronic memory, where the plurality of files include files having the same file format type; providing a file format name that is to be associated with the file format type; accessing the plurality of files from the electronic memory; identifying a common binary signature for the file format type included in the plurality of files; correlating the file format type with the common binary signature; and generating the security policy for the file format type using the file format name.

20 Claims, 17 Drawing Sheets

(56) References Cited

U.S. PATENT DOCUMENTS

| | | | |
|---|---|---|---|
| 10,326,735 B2 | 6/2019 | Jakobsson et al. | |
| 2002/0078382 A1 | 6/2002 | Sheikh et al. | |
| 2003/0145225 A1 | 7/2003 | Bruton et al. | |
| 2003/0145226 A1 | 7/2003 | Bruton et al. | |
| 2003/0159070 A1* | 8/2003 | Mayer | G06F 21/53 726/1 |
| 2003/0188189 A1 | 10/2003 | Desai et al. | |
| 2004/0034794 A1* | 2/2004 | Mayer | G06F 21/567 709/224 |
| 2005/0138402 A1 | 6/2005 | Yoon et al. | |
| 2005/0171954 A1 | 8/2005 | Hull et al. | |
| 2006/0085543 A1 | 4/2006 | Hrastar et al. | |
| 2006/0117172 A1 | 6/2006 | Zhang et al. | |
| 2006/0120526 A1* | 6/2006 | Boucher | H04L 63/20 380/247 |
| 2006/0190988 A1* | 8/2006 | Adams | G06F 21/6236 726/1 |
| 2006/0253905 A1* | 11/2006 | Mansel | G06F 21/55 726/23 |
| 2007/0113266 A1* | 5/2007 | Ross | G06F 21/10 726/1 |
| 2007/0208813 A1 | 9/2007 | Blagsvedt et al. | |
| 2007/0266421 A1* | 11/2007 | Vaidya | H04L 63/20 726/1 |
| 2008/0082722 A1 | 4/2008 | Savagaonkar et al. | |
| 2008/0127336 A1* | 5/2008 | Sun | G06F 21/566 726/22 |
| 2009/0249466 A1 | 10/2009 | Motil et al. | |
| 2009/0254572 A1 | 10/2009 | Redlich et al. | |
| 2009/0307745 A1* | 12/2009 | Inose | G06F 21/6218 726/1 |
| 2010/0010968 A1 | 1/2010 | Redlich et al. | |
| 2010/0125911 A1* | 5/2010 | Bhaskaran | G06Q 10/10 715/781 |
| 2012/0233656 A1* | 9/2012 | Rieschick | H04L 63/1441 726/1 |
| 2013/0080641 A1 | 3/2013 | Lui et al. | |
| 2013/0085761 A1 | 4/2013 | Bringert et al. | |
| 2013/0124644 A1 | 5/2013 | Hunt et al. | |
| 2013/0231084 A1 | 9/2013 | Raleigh | |
| 2013/0269029 A1 | 10/2013 | Nakawatase et al. | |
| 2013/0275574 A1 | 10/2013 | Hugard, IV et al. | |
| 2013/0298192 A1 | 11/2013 | Kumar et al. | |
| 2014/0082726 A1 | 3/2014 | Dreller et al. | |
| 2014/0198958 A1 | 7/2014 | Nathan et al. | |
| 2014/0379812 A1 | 12/2014 | Bastide et al. | |
| 2015/0066896 A1 | 3/2015 | Davis et al. | |
| 2015/0261969 A1 | 9/2015 | Frost | |
| 2015/0264049 A1 | 9/2015 | Achilles et al. | |
| 2015/0288714 A1 | 10/2015 | Emigh et al. | |
| 2016/0042179 A1 | 2/2016 | Weingarten et al. | |
| 2016/0055334 A1 | 2/2016 | Herwono et al. | |
| 2016/0148019 A1 | 5/2016 | Rambler et al. | |
| 2017/0063883 A1* | 3/2017 | Franzoni Martinez | H04L 63/107 |
| 2017/0126718 A1 | 5/2017 | Baradaran et al. | |
| 2017/0149795 A1 | 5/2017 | Day, II | |
| 2017/0214705 A1 | 7/2017 | Gupta | |
| 2017/0244729 A1 | 8/2017 | Fahrny et al. | |
| 2017/0251001 A1* | 8/2017 | Franzoni Martinez | H04L 63/102 |
| 2017/0302822 A1 | 10/2017 | Vandeweerd et al. | |
| 2017/0329966 A1 | 11/2017 | Koganti et al. | |
| 2018/0152471 A1 | 5/2018 | Jakobsson | |
| 2018/0174138 A1 | 6/2018 | Subbarayan et al. | |
| 2018/0234368 A1 | 8/2018 | Everton | |
| 2019/0034625 A1 | 1/2019 | Ford et al. | |
| 2019/0089740 A1* | 3/2019 | Hastings | H04L 43/50 |
| 2019/0109857 A1* | 4/2019 | Caffary, Jr. | G06F 16/176 |
| 2019/0124117 A1 | 4/2019 | Swafford | |
| 2019/0124118 A1 | 4/2019 | Swafford | |
| 2019/0199745 A1 | 6/2019 | Jakobsson et al. | |
| 2019/0213401 A1 | 7/2019 | Kuang | |
| 2019/0370851 A1 | 12/2019 | Haddadnia | |
| 2020/0074481 A1 | 3/2020 | Zhang | |
| 2020/0134192 A1 | 4/2020 | Gupta et al. | |
| 2020/0234243 A1 | 7/2020 | Miron et al. | |
| 2020/0242260 A1 | 7/2020 | Chen et al. | |
| 2020/0257821 A1 | 8/2020 | Lai | |
| 2020/0257822 A1 | 8/2020 | Ford et al. | |
| 2020/0257823 A1 | 8/2020 | Ford et al. | |

OTHER PUBLICATIONS microsoft.com, Windows Search Overview, https://msdn.microsoft.com/en-us/library/windows/desktop/aa965362, printed Nov. 20, 2017.

Stephen G. Dimmock et al., Is Fraud Contagious? Co-Worker Influence on Misconduct by Financial Advisers, The Journal of Finance, first published online Feb. 3, 2018.

Thomas R Hurd et al., A framework for analyzing contagion in assortative banking networks, PLoS ONE 12(2):e0170579, 2017.

SANS ISC InfoSec Forums, Tool to Detect Active Phishing Attacks Using Unicode Look-Alike Domains, downloaded Nov. 1, 2018, https://isc.sans.edu/forums/diary/Tool+to+Detect+Active+Phishing+Attacks+Using+Unicode+LookAlike+Domains/22310/.

* cited by examiner

1105

```
Order_67805978_tabuNesach_0_1 (2).pdf     ✕

1   %PDF-1.6        ~1120
 2   % ããIo
 3   18 0 obj
 4   <</Linearized 1/L 174303/o 20/E 160353/n 2/T 1739
 5   endobj
 6
 7   35 0 obj
 8   <</DecodeParms<</Columns 5/Predictor 12>>/Filter/
 9   hþbbd'DLE"b":NUL"EMỳÀ¤"^dþACKSYN SOH', ßÀ"Õ'v9
10   DLE¹ YFFHþwšÃÀEOT'k!HEOT(O2úÝñÖwϵNUL ETX NUL □ł DLE,
11   endstream
12   endobj
13   startxref
14   0
15   %%EOF
16
17   46 0 obj
18   <</Filter/FlateDecode/I 149/Length 138/S 64/V 125
19   hþb'"STX"[ACK SYN ACK ACK î 7 FFB FF BS EOT DC4 c ENQ bŽ
20   endstream
21   endobj
22   19 0 obj
23   <</AcroForm 36 0 R/Metadata 5 0 R/Pages 16 0 R/Ty
24   endobj
25   20 0 obj
26   <</Contents[23 0 R 24 0 R 25 0 R 26 0 R 27 0 R 28
27   endobj
28   21 0 obj
29   <</Filter/FlateDecode/First 73/Length 854/N 10/Ty
30   hþ┐ ●moã6FFÇ¿Š^¶, < ,RODC4p (4-š7ŰÐt;'‗, %.3àÚAâESC®
31   DLE°Ä‡SIÅr~U<¤æo®ØÔ%□vâ°X>ó/E]»é¶u»có-åŷ²ÜæGS STX,
32   }sÃ™óã&ɥ½ÖHÅmɥ □ HÕǐ^"b™FÝFFANAK§xFSÔSYN<ǐKœ9Ş1óþT
33   =v'GS?U/©'/n-wwÏæ‡°□þ/°f ⌠¬úª©7óvxŞV ⌠÷éå7^Ÿ^÷¡ÉĚò‡z
```

FIG. 11A

SYSTEM FOR GENERATING AN ELECTRONIC SECURITY POLICY FOR A FILE FORMAT TYPE

BACKGROUND OF THE INVENTION

Field of the Invention

The present invention relates in general to the field of computers and similar technologies, and in particular to software utilized in this field. Still more particularly, it relates to a method, system and computer-usable medium for identifying a binary signature for inclusion in an electronic security policy for the file format type.

Description of the Related Art

Users interact with physical, system, data, and services resources of all kinds, as well as each other, on a daily basis. Many such interactions provide opportunities for security breaches, such as data loss. Data loss incidents may turn into data leak incidents in cases where media containing sensitive information is lost and subsequently acquired by an unauthorized party. However, a data leak is possible without losing the data on the originating side. Other terms associated with data leakage prevention are information leak detection and prevention (ILDP), information leak prevention (ILP), content monitoring and filtering (CMF), information protection and control (IPC) extrusion prevention system (EPS), and intrusion prevention system (IPS). Data loss prevention security systems may be used to detect potential data breaches/data ex-filtration transmissions and prevent them by monitoring, detecting and blocking sensitive data while in-use (endpoint actions), in-motion (network traffic), and at-rest (data storage).

SUMMARY OF THE INVENTION

A system of one or more computers can be configured to perform particular operations or actions by virtue of having software, firmware, hardware, or a combination of them installed on the system that in operation causes or cause the system to perform actions of identifying binary signatures in a selected set of files and assigning at least one of the binary signatures to a file format name or file format type. One or more computer programs can be configured to perform particular operations or actions by virtue of including instructions that, when executed by data processing apparatus, cause the apparatus to perform the identification of the binary signatures in a selected set of files and assigning at least one of the binary signatures to a file format name or file format type. One general aspect includes a computer-implemented method for generating an electronic security policy for a file format type, including: receiving, at a user interface, identification of a plurality of files stored in electronic memory, where the plurality of files include files having the same file format type; providing a file format name that is to be associated with the file format type; accessing the plurality of files from the electronic memory; identifying a common binary signature for the file format type included in the plurality of files; correlating the file format type with the common binary signature; and generating the security policy for the file format type using the file format name, where the security policy includes the common binary signature for the file format type; and deploying the security policy for use in a computer system. Other embodiments of this aspect include corresponding computer systems, apparatus, and computer programs recorded on one or more computer storage devices, each configured to perform the actions of the methods.

Another general aspect includes a system including: a processor; a data bus coupled to the processor; and a non-transitory, computer-readable storage medium embodying computer program code, the non-transitory, computer-readable storage medium being coupled to the data bus, the computer program code interacting with a plurality of computer operations and including instructions executable by the processor and configured for: receiving, at a user interface, identification of a plurality of files stored in electronic memory, where the plurality of files include files having the same file format type; providing a file format name that is to be associated with the file format type; accessing the plurality of files from the electronic memory; identifying a common binary signature for the file format type included in the plurality of files; correlating the file format type with the common binary signature; and generating the security policy for the file format type using the file format name, where the security policy includes the common binary signature for the file format type; and deploying the security policy for use in a computer system. Other embodiments of this aspect include corresponding computer systems, apparatus, and computer programs recorded on one or more computer storage devices, each configured to perform the actions of the methods.

Another general aspect includes a non-transitory, computer-readable storage medium embodying computer program code, the computer program code including computer executable instructions configured for: receiving, at a user interface, identification of a plurality of files stored in electronic memory, where the plurality of files include files having the same file format type; providing a file format name that is to be associated with the file format type; accessing the plurality of files from the electronic memory; identifying a common binary signature for the file format type included in the plurality of files; correlating the file format type with the common binary signature; and generating the security policy for the file format type using the file format name, where the security policy includes the common binary signature for the file format type; and deploying the security policy for use in a computer system. Other embodiments of this aspect include corresponding computer systems, apparatus, and computer programs recorded on one or more computer storage devices, each configured to perform the actions of the methods.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 11A, 11B, and 11C, generally referred to herein as FIG. 11, show one example of files having a common binary signature;

DETAILED DESCRIPTION

Figure 1:
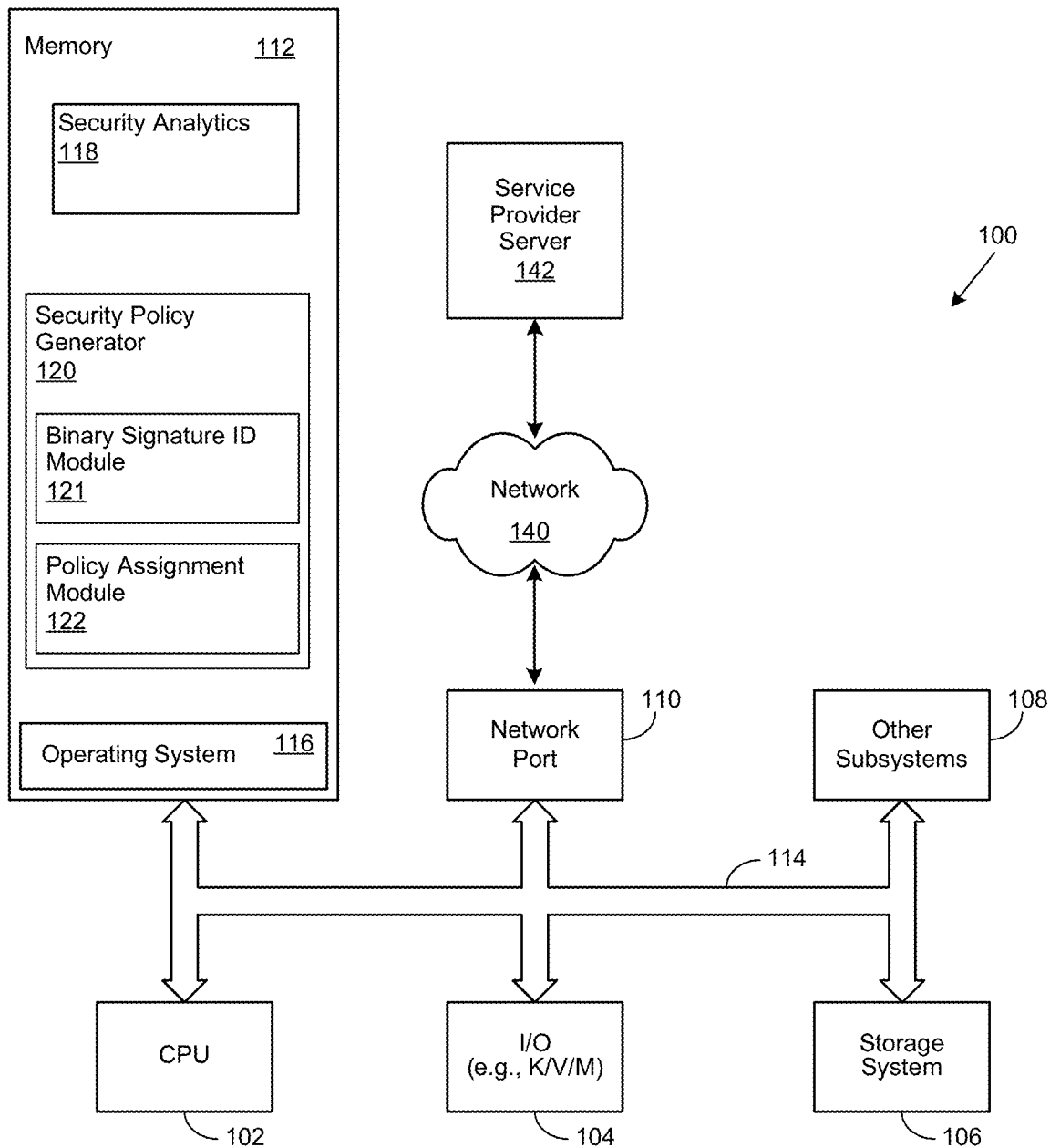
FIG. 1 depicts an exemplary client computer in which the present invention may be implemented.

A method, system and computer-usable medium are disclosed for generating an electronic security policy for a file format type. Certain aspects of the invention recognize that there is often a need to effectively and timely generate a security policy for a particular file format type. Certain aspects of the invention also recognize that security policies for a file format type may employ binary signatures that are common to the file format type. Certain aspects of the invention also recognize that the common binary signatures for the file format type may be automatically extracted from a plurality of files selected by a user so that file format type may be timely added to a security system generator to accurately and timely generate a corresponding security policy and thereby provide a prompt response to potential security threats relating to the file format types. Certain aspects of the invention recognize that such operations may be efficiently executed by a user through a user-friendly interface that allows the user to select files for binary signature analysis.

Certain aspects of the invention also recognize that a user may choose to associate a file name type with a file format type. As used herein, a file format type relates to a general set of characteristics that are common to a plurality of files, which allow a program to access, display, operate on, and/or a process the plurality of files in a common manner. As an example, word processing documents generated, for example, using Microsoft Word, include a common file format used by the Microsoft Word program to access, display, manipulate, etc., the content of word processing documents generated by the program. In some examples, the file format type may be referenced using the file extension of files having the file format type (e.g., .doc, .jpg, etc.). As used herein, a file format name is the name with which a file format type is to be associated in a security policy generator. In certain examples, the file format name used with reference to the file format type may be the file extension of files having the file format type. As an example, word processing files having a Microsoft Word file format type, may be assigned a file format name "dot." In certain examples, the file format name used with reference to the file format type may be independent of the file extension (e.g., "MSWORD" for files having the Microsoft Word file format type).

Certain aspects of the invention also recognize that the security policy for the file format type may include the automatically detected common binary signature, and that the common binary signature may be deployed to various devices in the computer system. Certain aspects of the invention recognize that enforcement of the security policy at the devices may involve detection of detect events associated with the file format type pursuant to enforcing the security policy.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS)

116 and in various embodiments may also include a security analytics system 118 and a security policy generator 120. In certain embodiments, the security policy generator 120 includes a binary signature ID module 121 and a policy assignment module 122. In one embodiment, the information handling system 100 is able to download the security analytics system 118 and/or security policy generator 120 from the service provider server 142. In another embodiment, the security analytics system 118 and security policy generator 120 are provided as a service from the service provider server 142.

In various embodiments, the security analytics system 118 performs a security analytics operation to events relating to files of various file format types. In certain embodiments, the binary signature ID module 121 performs automatic binary signature identification for file format types/names that are to be used in security analytics executed by the security analytics system 118. In certain embodiments, the automatic binary signature operation is executed on a plurality of files selected by a user. In certain embodiments, a human-readable file format name is associated with the binary signature during the binary signature identification operations. In certain embodiments, a user may engage the security policy generator 122 to generate a security policy for a file format type using the corresponding file format name. In certain embodiments, the security policy generated by the security policy generator 122 includes the binary signature for the file format type.

In certain embodiments, the automatic binary signature identification and security policy generator improve processor efficiency, and thus the efficiency of the information handling system 100, by facilitating automatic binary signature identification for file format types used in security policies implemented in security analytics functions. As will be appreciated, once the information handling system 100 is configured to perform the security analytics operation, automatic binary signature identification, and security policy generation operations, the information handling system 100 becomes a specialized computing device specifically configured to perform such operations and is not a general purpose computing device. Rather, the implementation of the security analytics system 118, binary signature ID module 120, and security policy generator 122 on the information handling system 100 improves the functionality of the information handling system 100 and provides a useful and concrete result of performing efficient and timely generation of security policies relating to new file format types for deployment in the information processing system 100 and/or other interconnected information processing systems.

Figure 2:
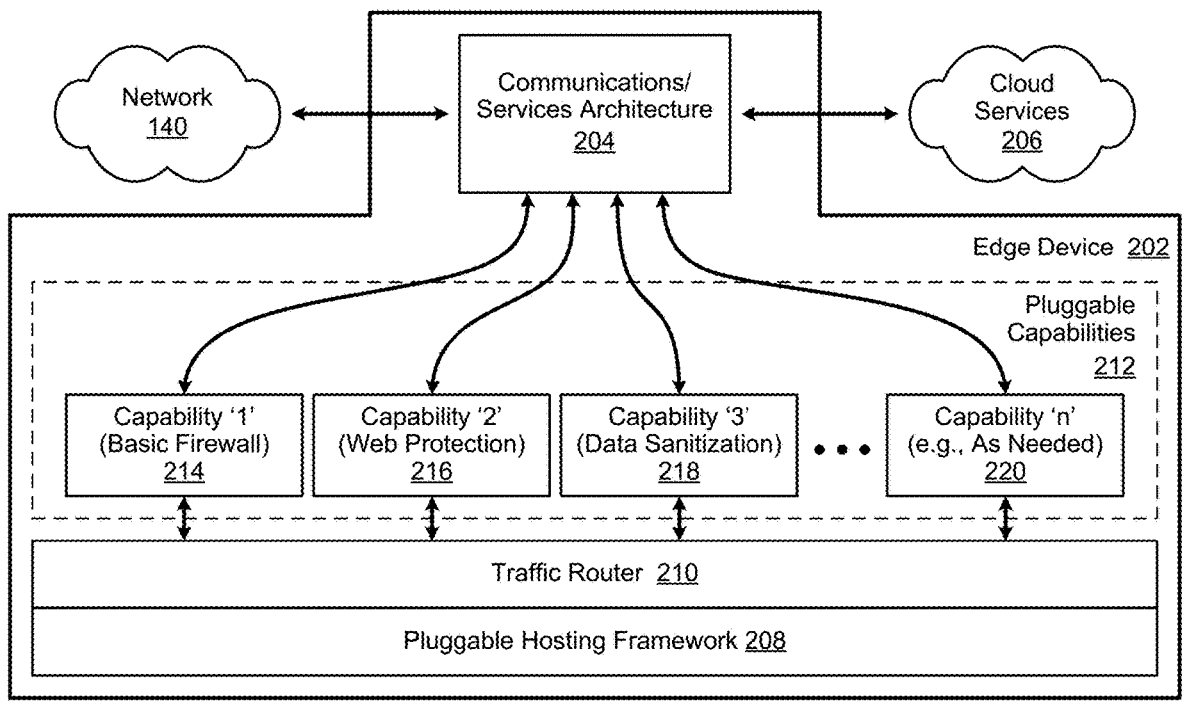
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with managing the use of a blockchain to access a cyberprofile, described in greater detail herein, or other sensitive private information (SPI), likewise described in greater detail herein. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
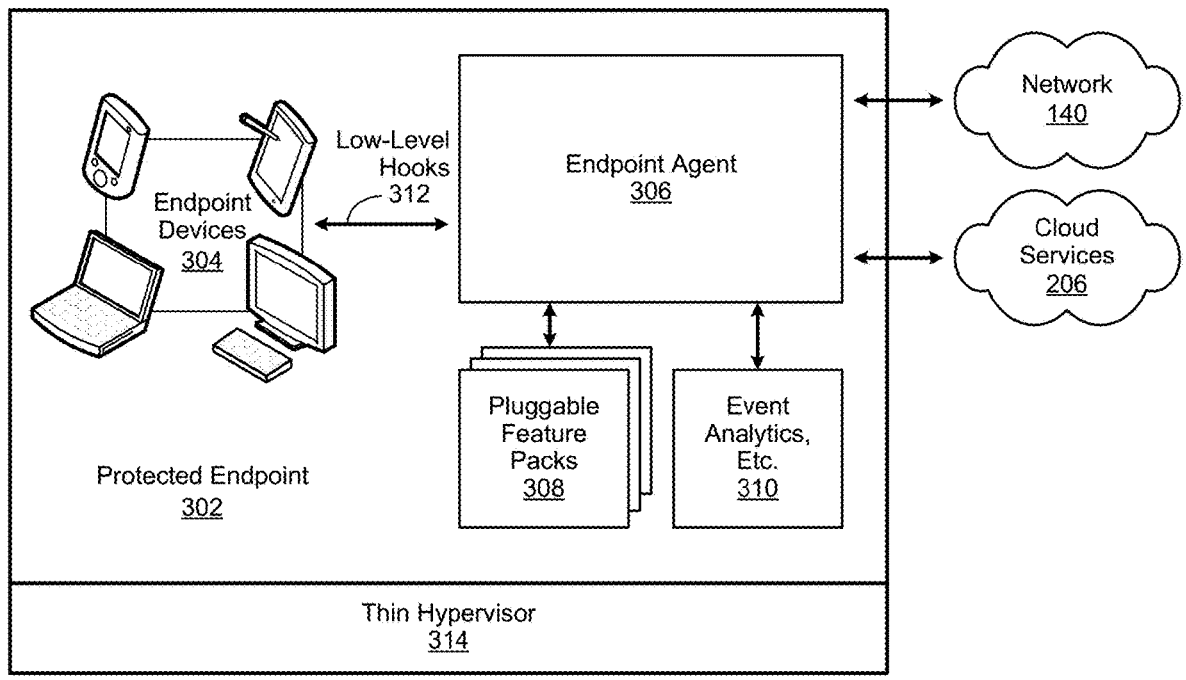
FIG. 3 is a simplified block diagram of an endpoint agent.

FIG. 3 is a simplified block diagram of an endpoint agent implemented in accordance with an embodiment of the disclosure. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed user behavior.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with particular criteria before they are granted access to network resources. As an example, a given endpoint device 304 may be required to have a particular operating system (OS), or version thereof, a Virtual Private Network (VPN) client, anti-virus software with current updates, and so forth. In certain embodiments, the protected endpoint 302 may be implemented to perform operations associated with providing real-time resolution of the identity of an entity at a particular point in time, as described in greater detail herein. In certain embodiments, the protected endpoint 302 may be implemented to provide temporal information, such as time-stamp information, associated with such operations.

In certain embodiments, the real-time resolution of the identity of an entity at a particular point in time may be based upon contextual information associated with a given user behavior. As used herein, contextual information broadly refers to any information, directly or indirectly, individually or in combination, related to a particular user behavior. In certain embodiments, user behavior may include a user's physical behavior, cyber behavior, or a combination thereof. As likewise used herein, physical behavior broadly refers to any user behavior occurring within a physical realm. More particularly, physical behavior may include any action enacted by a user that can be objectively observed, or indirectly inferred, within a physical realm.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be electronically observed.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, makes them electronically-observable.

As likewise used herein, cyberspace broadly refers to a network 140 environment capable of supporting communication between two or more entities. In certain embodiments, the entity may be a user, an endpoint device 304, or various resources, described in greater detail herein. In certain embodiments, the entities may include various endpoint devices 304 or resources operating at the behest of an entity, such as a user. In certain embodiments, the communication between the entities may include audio, image, video, text, or binary data.

The contextual information may include a user's authentication factors 604. Contextual information may likewise include various temporal identity resolution factors, such as identification factors associated with the user, the date/time/frequency of various user behaviors, the user's location, the user's role or position in an organization, their associated access rights, and certain user gestures employed by the user in the enactment of a user behavior. Other contextual information may likewise include various user interactions, whether the interactions are with an endpoint device 304, a network 140, a resource, or another user. In certain embodiments, user behaviors, and their related contextual information, may be collected at particular points of observation, and at particular points in time, described in greater detail herein.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the OS level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 308 is invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 are invoked by the endpoint agent 306 according to the occurrence of a particular user behavior. In certain embodiments, the individual features of a pluggable feature pack 308 are invoked by the endpoint agent 306 according to the occurrence of a particular temporal event, described in greater detail herein. In certain embodiments, the individual features of a pluggable feature pack 308 are invoked by the endpoint agent 306 at a particular point in time. In these embodiments, the method by which a given user behavior, temporal event, or point in time is selected is a matter of design choice.

In certain embodiments, the individual features of a pluggable feature pack 308 may be invoked by the endpoint agent 306 according to the context of a particular user behavior. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-need basis.

In certain embodiments, the endpoint agent 306 may be implemented with additional functionalities, such as event analytics 310. In certain embodiments, the event analytics 310 functionality may include analysis of various user behaviors, described in greater detail herein. In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
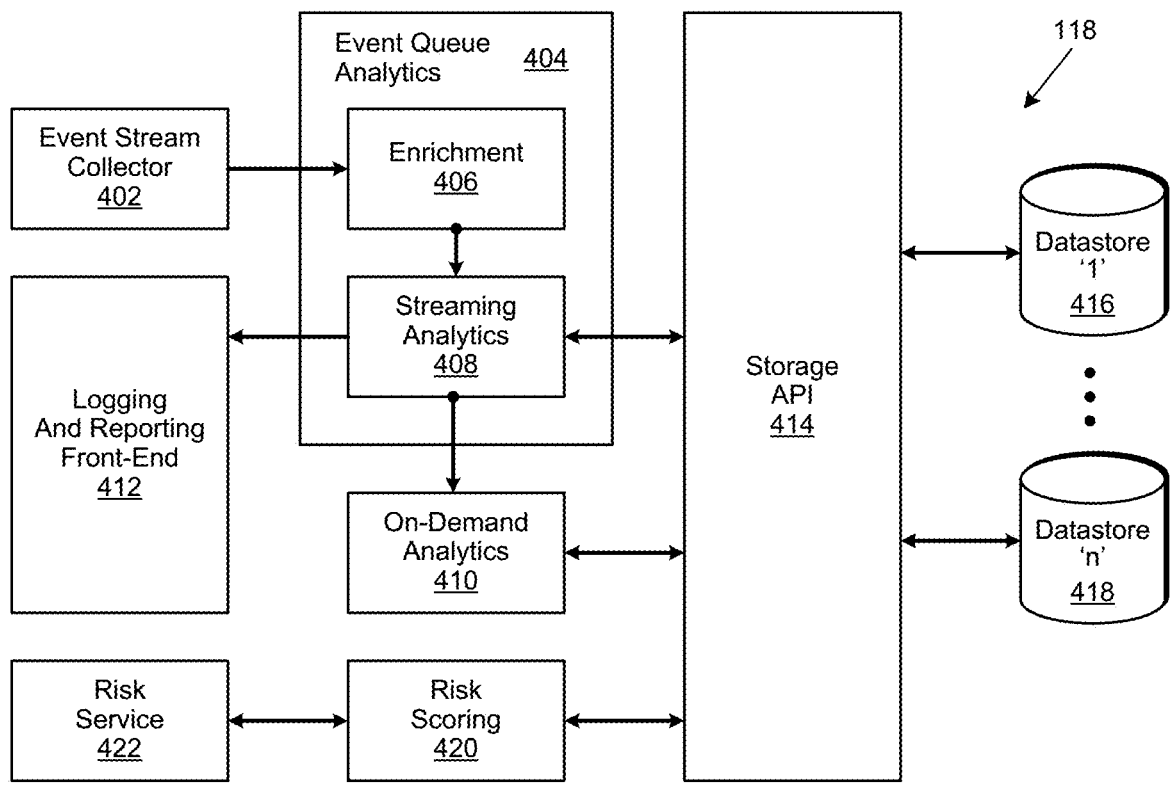
FIG. 4 is a simplified block diagram of a security analytics system.

FIG. 4 is a simplified block diagram of a security analytics system implemented in accordance with an embodiment of the disclosure. In certain embodiments, the security analytics system 118 shown in FIG. 4 may include an event queue analytics 404 module, described in greater detail herein. In certain embodiments, the event queue analytics 404 subsystem may be implemented to include an enrichment 406 module and a streaming analytics module 408. In certain embodiments, the security analytics system 118 may be implemented to provide log storage, reporting, and analytics capable of performing streaming and on-demand analytics operations. In certain embodiments, such operations may be associated with defining and managing a user profile, detecting anomalous, abnormal, unexpected or malicious user behavior, adaptively responding to mitigate risk, or a combination thereof, as described in greater detail herein.

In certain embodiments, the security analytics system 118 may be implemented to provide a uniform platform for storing events and contextual information associated with various user behaviors and performing longitudinal analytics. As used herein, longitudinal analytics broadly refers to performing analytics of user behaviors occurring over a particular period of time. As an example, a user may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious. As another example, certain entity identifier information (e.g., a user name) associated with a user may change over time. In this example, the change in user name, during a particular period of time or at a particular point in time, may represent suspicious user behavior.

In certain embodiments, the security analytics system 118 may be implemented to be scalable. In certain embodiments, the security analytics system 118 may be implemented in a centralized location, such as a corporate data center. In these embodiments, additional resources may be added to the security analytics system 118 as needs grow. In certain embodiments, the security analytics system 118 may be implemented as a distributed system. In these embodiments, the security analytics system 118 may span multiple information handling systems. In certain embodiments, the security analytics system 118 may be implemented in a cloud environment. In certain embodiments, the security analytics system 118 may be implemented in a virtual machine (VM) environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 402 may be implemented to collect event and related contextual information, described in greater detail herein, associated with various user behaviors. In these embodiments, the method by which the event and contextual information is selected to be collected by the event stream collector 402 is a matter of design choice. In certain embodiments, the event and contextual information collected by the event stream collector 402 may be processed by an enrichment module 406 to generate enriched user behavior information. In certain embodiments, the enrichment may include certain contextual information related to a particular user behavior or event. In certain embodiments, the enrichment may include certain temporal information, such as timestamp information, related to a particular user behavior or event.

In certain embodiments, enriched user behavior information may be provided by the enrichment module 406 to a streaming analytics module 408. In turn, the streaming analytics module 408 may provide some or all of the enriched user behavior information to an on-demand analytics module 410. As used herein, streaming analytics, such as those performed by streaming analytics module 408, broadly refers to analytics performed in near real-time on enriched user behavior information as it is received. Likewise, on-demand analytics, such as those performed by on-demand analytics module 410 broadly refers herein to analytics performed, as they are requested, on enriched user behavior information after it has been received. In certain embodiments, the enriched user behavior information may be associated with a particular event. In certain embodiments, the enrichment module 406 and streaming analytics module 408 may be implemented to perform event queue analytics 404 operations.

In certain embodiments, the on-demand analytics module 410 may execute analytics operations on enriched user behavior associated with a particular interval of, or point in, time. In certain embodiments, the streaming analytics module 408 or on-demand analytics module 410 analytics may execute analytics on enriched user behavior associated with a particular user, group of users, one or more entities, or a combination thereof. In certain embodiments, the streaming analytics module 408 or on-demand analytics module 410 may perform analytics on enriched user behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming analytics module 408 or on-demand analytics module 410 may be provided to a storage Application Program Interface (API) 414. In turn, the storage API 414 may be implemented to provide access to various datastores '1' 416 through 'n' 418, which in turn are used to store the results of the analytics operations. In certain embodiments, the security analytics system 118 may be implemented with a logging and reporting front-end 412, which is used to receive the results of analytics operations performed by the streaming analytics module 408. In certain embodiments, the datastores '1' 416 through 'n' 418 may variously include a datastore of entity identifiers, temporal events, or a combination thereof.

In certain embodiments, the security analytics system 118 may include a risk scoring 420 module implemented to perform risk scoring operations, described in greater detail herein. In certain embodiments, functionalities of the risk scoring 420 module may be provided in the form of a risk management service 422. In certain embodiments, the risk management service 422 may be implemented to perform operations associated with defining and managing a user profile. In certain embodiments, the risk management service 422 may be implemented to perform operations associated with detecting anomalous, abnormal, unexpected or malicious user behavior and adaptively responding to mitigate risk. In certain embodiments, the risk management service 422 may be implemented to provide the results of various analytics operations performed by the streaming analytics module 406 or on-demand analytics module 408. In certain embodiments, the risk management service 422 may be implemented to use the storage API 414 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
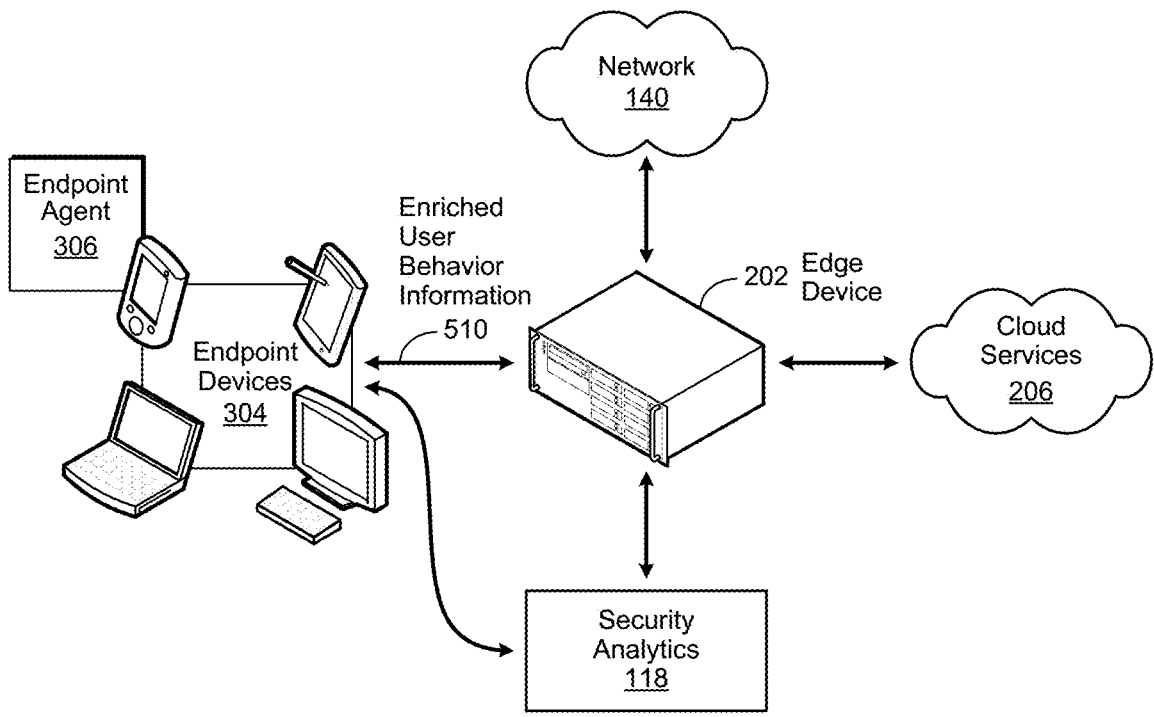
FIG. 5 is a simplified block diagram of a security analytics system.

FIG. 5 is a simplified block diagram of the operation of a security analytics system implemented in accordance with an embodiment of the disclosure. In certain embodiments, the security analytics system 118 may be implemented to perform operations associated with detecting anomalous, abnormal, unexpected or malicious user behavior. In certain embodiments, the security analytics system 118 may be implemented in combination with one or more endpoint agents 306, one or more edge devices 202, various cloud services 206, and a network 140 to perform such operations.

In certain embodiments, the network edge device 202 may be implemented in a bridge, a firewall, or a passive monitoring configuration. In certain embodiments, the edge device 202 may be implemented as software running on an information handling system. In certain embodiments, the network edge device 202 may be implemented to provide integrated logging, updating and control. In certain embodiments, the edge device 202 may be implemented to receive network requests and context-sensitive user behavior information in the form of enriched user behavior information 510, described in greater detail herein, from an endpoint agent 306, likewise described in greater detail herein.

In certain embodiments, the security analytics system 118 may be implemented as both a source and a sink of user behavior information. In certain embodiments, the security analytics system 118 may be implemented to serve requests for user/resource risk data. In certain embodiments, the edge device 202 and the endpoint agent 306, individually or in combination, may provide certain user behavior information to the security analytics system 118 using either push or pull approaches familiar to skilled practitioners of the art.

The edge device 202 may be implemented in certain embodiments to receive enriched user behavior information 510 from the endpoint agent 306. It will be appreciated that such enriched user behavior information 510 will likely not be available for provision to the edge device 202 when an endpoint agent 306 is not implemented for a corresponding endpoint device 304. However, the lack of such enriched user behavior information 510 may be accommodated in various embodiments, albeit with reduced functionality related to operations associated with defining and managing a user profile, detecting anomalous, abnormal, unexpected or malicious user behavior, mitigating associated risk, or a combination thereof.

In certain embodiments, a given user behavior may be enriched by an associated endpoint agent 306 attaching contextual information to a request. In certain embodiments, the context is embedded within a network request, which is then provided as enriched user behavior information 510. In certain embodiments, the contextual information may be concatenated, or appended, to a request, which in turn may be provided as enriched user behavior information 510. In these embodiments, the enriched user behavior information 510 may be unpacked upon receipt and parsed to separate the request and its associated contextual information. Certain embodiments of the disclosure reflect an appreciation that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores associated with a particular event on a per-user basis may be requested. In certain embodiments, the service may be requested from the security analytics system 118. In certain embodiments, the service may be requested from various cloud services 206.

In certain embodiments, contextual information associated with a particular user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web browsing activity, email, and so forth, all of which are essentially requests for service by an endpoint device 304. In certain embodiments, such service requests may be associated with temporal event information, described in greater detail herein. Consequently, such requests can be enriched by the addition of user behavior contextual information (e.g., UserAccount, interactive/automated, data-touched, temporal event information, etc.). Accordingly, the edge device 202 can then use this information to manage the appropriate response to submitted requests.

In certain embodiments, the security analytics system 118 may be implemented in different operational configurations. In certain embodiments, the security analytics system 118 may be implemented by using the endpoint agent 306. In certain embodiments, the security analytics system 118 may be implemented by using endpoint agent 306 in combination with the edge device 202. In certain embodiments, the cloud services 206 may likewise be implemented for use by the endpoint agent 306, the edge device 202, and the security analytics system 118, individually or in combination. In these embodiments, the security analytics system 118 may be primarily oriented to performing risk assessment operations related to user actions, program actions, data accesses, or a combination thereof. In certain embodiments, program actions may be treated as a proxy for the user.

In certain embodiments, the endpoint agent 306 may be implemented to update the security analytics system 118 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 118 may be implemented to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 118 may be primarily oriented to applying risk mitigations in a way that maximizes security effort return-on-investment (ROI). In certain embodiments, this approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed. To extend the example, the edge device 202 and security analytics system 118 may be coupled such that requests can be contextualized and fitted into a framework that evaluates their associated risk. Certain embodiments of the disclosure reflect an appreciation that such an approach works well with web-based data loss protection (DLP) approaches, as each transfer is no longer examined in isolation, but in the broader context of an identified user's actions, at a particular time, on the network 140.

As another example, the security analytics system 118 may be implemented to perform risk scoring processes to decide whether to block or allow unusual flows. Certain embodiments of the disclosure reflect an appreciation that such an approach is highly applicable to defending against point-of-sale (POS) malware, a breach technique that has become increasingly more common in recent years. Certain embodiments of the disclosure likewise reflect an appreciation that while various edge device 202 implementations may not stop all such exfiltrations, they may be able to complicate the task for the attacker.

In certain embodiments, the security analytics system 118 may be primarily oriented to maximally leverage contextual information associated with various user behaviors within the system. In certain embodiments, data flow tracking is performed by one or more endpoint agents 306, which allows the quantity and type of information associated with particular hosts to be measured. In turn, this information may be used to determine how the edge device 202 handles requests. By contextualizing such user behavior on the network 140, the security analytics system 118 can provide intelligent protection, making decisions that make sense in the broader context of an organization's activities. Certain embodiments of the disclosure reflect an appreciation that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6A:
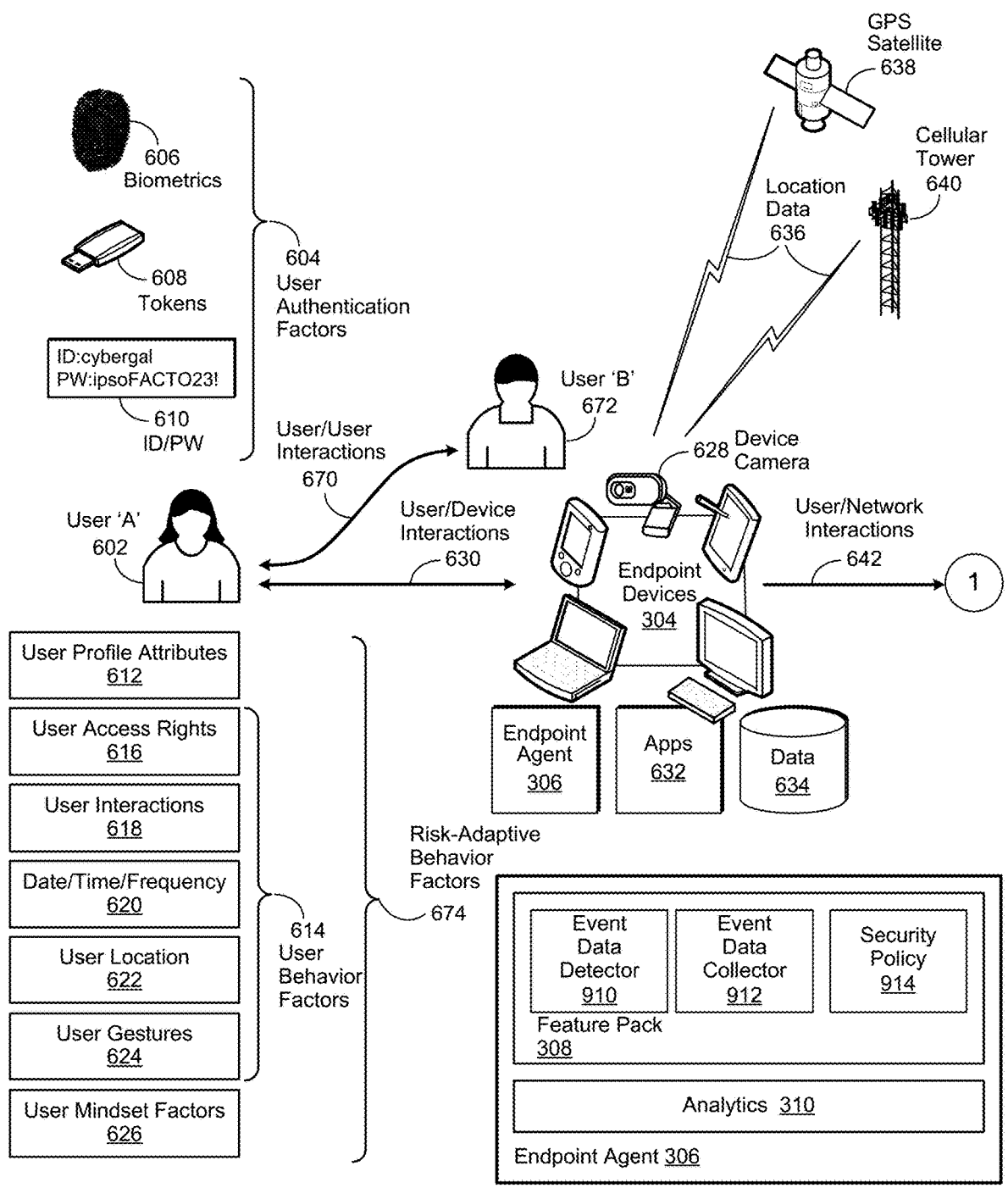
FIGS. 6a and 6b shows a block diagram of a security analytics system environment.
Figure 6B:
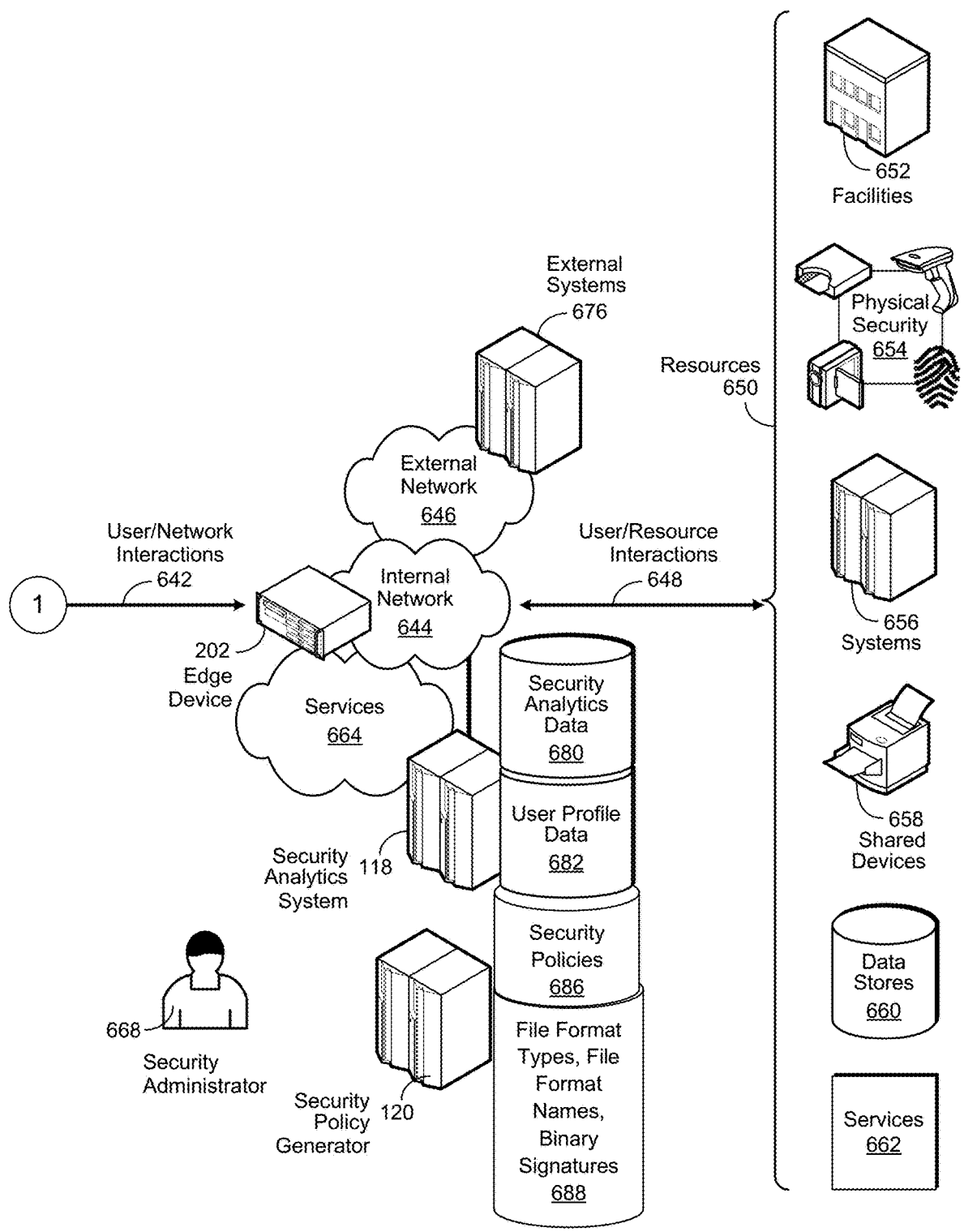

FIGS. 6a and 6b show a block diagram of an electronic environment in which certain embodiments of the disclosed system may operate. In certain embodiments, analyses performed by a security analytics system 118 may be used to identify anomalous, abnormal, unexpected or malicious behavior associated with an entity. In certain embodiments, the anomalous, abnormal, unexpected or malicious behavior may be identified at a particular point in time, during the occurrence of an event, the enactment of a user behavior, or a combination thereof.

As used herein, an entity broadly refers to something that exists as itself, whether physically or abstractly. In certain embodiments, an entity may be an individual user, a group, an organization, or a government. In certain embodiments, an entity may likewise be an item, a device, such as endpoint device 304 and edge device 202, a network, such as an internal network 644 and external network 646, a domain, an operation, or a process. In certain embodiments, an entity may be a resource 650, such as a geographical location or formation, a physical facility 652, such as a venue, various physical security devices 654, a system 656, shared devices 658, such as printer, scanner, or copier, a datastore 660, or a service 662, such as a service 662 operating in a cloud environment.

As likewise used herein, an event broadly refers to the occurrence of an action performed by an entity. In certain embodiments, the action may be directly associated with a user behavior, described in greater detail herein. As an example, a first user may attach a binary file infected with a virus to an email that is subsequently sent to a second user. In this example, the act of attaching the binary file to the email is directly associated with a user behavior enacted by the first user. In certain embodiments, the action may be indirectly associated with a user behavior. To continue the example, the recipient of the email may open the infected binary file, and as a result, infect their computer with malware. To further continue the example, the act of opening the infected binary file is directly associated with a user behavior enacted by the second user. However, the infection of the email recipient's computer by the infected binary file is indirectly associated with the described user behavior enacted by the second user.

In certain embodiments, information associated with such user behavior may be stored in a user profile. As used herein, a user profile broadly refers to a collection of information that uniquely describes a user's identity and their associated behavior, whether the behavior occurs within a physical realm or cyberspace. In certain embodiments, the user profile may be stored in a repository of user profile data 683. In certain embodiments, the user profile may include user profile attributes 612, user behavior factors 614, user mindset factors 626, or a combination thereof.

As used herein, a user profile attribute 612 broadly refers to data or metadata that can be used, individually or in combination with other user profile attributes 612, to uniquely ascertain the identity of an entity. In certain embodiments, the user profile attributes 612 may include certain personal information. In certain embodiments, the personal information may include non-sensitive personal information associated with a user, such as their name, title, position, role, and responsibilities. In certain embodiments, the personal information may likewise include technical skill level information, peer information, expense account information, paid time off (PTO) information, data analysis information, insider information, misconfiguration information, third party information, or a combination thereof.

In certain embodiments, the personal information may contain sensitive personal information associated with a user. As used herein, sensitive personal information (SPI), also commonly referred to as personally identifiable information (PII), broadly refers to any information usable to ascertain the identity of a user, either by itself, or in combination with other information, such as contextual information described in greater detail herein. Examples of SPI may include the full or legal name of a user, initials or nicknames, place and date of birth, home and business addresses, personal and business telephone numbers, their gender, and other genetic information.

Additional examples of SPI may include government-issued identifiers, such as a Social Security Number (SSN) or a passport number, vehicle registration plate and serial numbers, and driver's license numbers. Other examples of SPI may include certain email addresses and social media identifiers, financial account information, such as credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user authentication factors 604.

In certain embodiments, the user authentication factors 604 may be used to authenticate the identity of a user, such as user 'A' 602 or 'B' 672. In certain embodiments, the user authentication factors 604 may be used to ensure that a particular user, such as user 'A' 602 or 'B' 672, is associated with their corresponding user profile, rather than a user profile associated with another user. In certain embodiments, the user authentication factors 604 may include a user's biometrics 606 (e.g., a fingerprint or retinal scan), tokens 608 (e.g., a dongle containing cryptographic keys), user identifiers and passwords (ID/PW) 610, and personal identification numbers (PINs).

As used herein, a user behavior factor 614 broadly refers to information associated with a user's behavior, whether the behavior occurs within a physical realm or cyberspace. In certain embodiments, the user behavior factors 614 may include the user's access rights 616, the user's interactions 618, and the date/time/frequency 620 of those interactions 618. In certain embodiments, the user behavior factors 614 may likewise include the user's location 622 when the interactions 618 are enacted, and the user gestures 624 used to enact the interactions 618.

In certain embodiments, the user gestures 624 may include key strokes on a keypad, a cursor movement, a mouse movement or click, a finger swipe, tap, or other hand gesture, an eye movement, or some combination thereof. In certain embodiments, the user gestures 624 may likewise include the cadence of the user's keystrokes, the motion, force and duration of a hand or finger gesture, the rapidity and direction of various eye movements, or some combination thereof. In certain embodiments, the user gestures 624 may include various audio or verbal commands performed by the user.

In various embodiments, certain date/time/frequency 620 user behavior factors 614 may be implemented as ontological or societal time, or a combination thereof. As used herein, ontological time broadly refers to how one instant in time relates to another in a chronological sense. As an example, a first user behavior enacted at 12:00 noon on May 17, 2017 may occur prior to a second user behavior enacted at 6:39 PM on May 18, 2018. Skilled practitioners of the art will recognize one value of ontological time is to determine the order in which various user behaviors have been enacted.

As likewise used herein, societal time broadly refers to the correlation of certain user profile attributes 612, user behavior factors 614, user mindset factors 626, or a combination thereof, to one or more instants in time. As an example, user 'A' 602 may access a particular system 656 to download a customer list at 3:47 PM on Nov. 3, 2017. Analysis of their user behavior profile indicates that it is not unusual for user 'A' 602 to download the customer list on a weekly basis. However, examination of their user behavior profile also indicates that user 'A' 602 forwarded the downloaded customer list in an email message to user 'B' 672 at 3:49 PM that same day. Furthermore, there is no record in their user behavior profile that user 'A' 602 has ever communicated with user 'B' 672 in the past. Moreover, it may be determined that user 'B' 672 is employed by a competitor. Accordingly, the correlation of user 'A' 602 downloading the customer list at one point in time, and then forwarding the customer list to user 'B' 672 at a second point in time shortly thereafter, is an example of societal time.

In a variation of the prior example, user 'A' 602 may download the customer list at 3:47 PM on Nov. 3, 2017. However, instead of immediately forwarding the customer list to user 'B' 672, user 'A' 602 leaves for a two week vacation. Upon their return, they forward the previously-downloaded customer list to user 'B' 672 at 9:14 AM on Nov. 20, 2017. From an ontological time perspective, it has been two weeks since user 'A' 602 accessed the system 656 to download the customer list. However, from a societal time perspective, they have still forwarded the customer list to user 'B' 672, despite two weeks having elapsed since the customer list was originally downloaded.

Accordingly, the correlation of user 'A' 602 downloading the customer list at one point in time, and then forwarding the customer list to user 'B' 672 at a much later point in time, is another example of societal time. More particularly, it may be inferred that the intent of user 'A' 602 did not change during the two weeks they were on vacation. Furthermore, user 'A' 602 may have attempted to mask an intended malicious act by letting some period of time elapse between the time they originally downloaded the customer list and when they eventually forwarded it to user 'B' 672. From the foregoing, those of skill in the art will recognize that the use of societal time may be advantageous in determining whether a particular user behavior is acceptable, anomalous, abnormal, unexpected or malicious.

As used herein, mindset factors 626 broadly refer to information used to determine the mental state of a user at a particular point in time, during the occurrence of an event, an enactment of a user behavior, or combination thereof. As used herein, mental state broadly refers to a hypothetical state corresponding to the way a user may be thinking or feeling. In certain embodiments, the user mindset factors 626 may include a personality type. Examples of known approaches for determining a personality type include Jungian types, Myers-Briggs type indicators, Keirsy Temperament Sorter, Socionics, Enneagram of Personality, and Eyseneck's three-factor model.

In certain embodiments, the mindset factors 626 may include various behavioral biometrics. As likewise used herein, a behavioral biometric broadly refers to a physiological indication of a user's mental state. Examples of behavioral biometrics may include a user's blood pressure, heart rate, respiratory rate, eye movements and iris dilation, facial expressions, body language, tone and pitch of voice, speech patterns, and so forth.

In certain embodiments, the security analytics system 118 may be implemented to process certain entity information associated with providing resolution of the identity of an entity at a particular point in time. As likewise used herein, entity information broadly refers to information associated with a particular entity. In various embodiments, the entity information may include certain types of content. In certain embodiments, such content may include text, unstructured data, structured data, graphical images, photographs, audio recordings, video recordings, biometric information, and so forth. In certain embodiments, the entity information may include metadata. In various embodiments, the metadata may include entity attributes, which in turn may include certain entity identifier types or classifications.

In various embodiments, the security analytics system 118 may be implemented to use certain entity identifier information to ascertain the identity of an associated entity at a particular point in time. As used herein, entity identifier information broadly refers to an information element of an entity that can be used to ascertain or corroborate the identity of an associated entity at a particular point in time. In certain embodiments, the entity identifier information may include user authentication factors 604, user profile attributes 612, location data 636, information associated with various endpoint devices 304 and edge devices 202, internal network 644 and external network 646, resource entities 650, or a combination thereof.

In certain embodiments, the entity identifier information may include temporal information. As used herein, temporal information broadly refers to a measure of time (e.g., a date, timestamp, etc.), a measure of a duration of time (e.g., a minute, hour, day, etc.), or a measure of an interval of time (e.g., between Jun. 3, 2017 and Mar. 4, 2018, etc.). In certain embodiments, the temporal information may be associated with an event associated with a particular point in time. As used herein, such a temporal event broadly refers to an occurrence, action or activity enacted by, or associated with, an entity at a particular point in time.

Examples of such temporal events include making a phone call, sending a text or an email, using a device, such as an endpoint device 304, accessing a system 656, interacting with a physical security device 645 or shared devices 658, and entering a physical facility 652. Other examples of temporal events include uploading, transferring, downloading, modifying, or deleting data, such as data stored in a datastore 660, or accessing a service 662. Yet other examples of temporal events include user/user 670 interactions between two or more users, user/device 630 interactions between a user and a device, user/network 642 interactions between a user and a network, and user/resource 648 interactions between a user and a resource 650, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the entity information may include metadata. In various embodiments, the metadata may include temporal event attributes, which in turn may include certain entity identifier types or classifications, described in greater detail herein.

In certain embodiments, the security analytics system 118 may be implemented to use information associated with such temporal resolution of an entity's identity to assess the risk associated with a particular entity, at a particular point in time, and adaptively respond with an associated response. In certain embodiments, the security analytics system 118 may be implemented to respond to such assessments in order to reduce operational overhead and improve system efficiency while maintaining security integrity. In certain embodiments, the response to such assessments may be performed by a security administrator 668. Accordingly, certain embodiments of the disclosure may be directed towards assessing the risk associated with the affirmative resolution of the identity of an entity at a particular point in time in combination with its associated contextual information. Consequently, the security analytics system 118 may be more oriented in various embodiments to risk adaptation than to security administration.

In certain embodiments, the security analytics system 118 may be implemented to use information associated with certain user behavior elements to resolve the identity of an entity at a particular point in time. A user behavior element, as used herein, broadly refers to a discrete element of a user's behavior during the performance of a particular operation in a physical realm, cyberspace, or a combination thereof. In certain embodiments, such user behavior elements may be associated with a user/device 630, a user/ network 642, a user/resource 648, a user/user 670 interaction, or a combination thereof.

As an example, user 'A' 602 may use an endpoint device 304 to browse a particular web page on a news site on the Internet. In this example, the individual actions performed by user 'A' 602 to access the web page are user behavior elements that constitute a user behavior. As another example, user 'A' 602 may use an endpoint device 304 to download a data file from a particular system 656. In this example, the individual actions performed by user 'A' 602 to download the data file, including the use of one or more user authentication factors 604 for user authentication, are user behavior elements that constitute a user behavior. In certain embodiments, the user/device 630 interactions may include an interaction between a user, such as user 'A' 602 or 'B' 672, and an endpoint device 304.

In certain embodiments, the user/device 630 interaction may include interaction with an endpoint device 304 that is not connected to a network at the time the interaction occurs. As an example, user 'A' 602 or 'B' 672 may interact with an endpoint device 304 that is offline, using applications 632, accessing data 634, or a combination thereof, it may contain. Those user/device 630 interactions, or their result, may be stored on the endpoint device 304 and then be accessed or retrieved at a later time once the endpoint device 304 is connected to the internal network 644 or external network 646. In certain embodiments, an endpoint agent 306 may be implemented to store the user/device 630 interactions when the user endpoint device 304 is offline.

In certain embodiments, an endpoint device 304 may be implemented with a device camera 628. In certain embodiments, the device camera 628 may be integrated into the endpoint device. In certain embodiments, the device camera 628 may be implemented as a separate device configured to interoperate with the endpoint device 304. As an example, a webcam familiar to those of skill in the art may be implemented receive and communicate various image and audio signals to an endpoint device 304 via a Universal Serial Bus (USB) interface.

In certain embodiments, the device camera 628 may be implemented to capture provide user/device 630 interaction information to an endpoint agent 306. In various embodiments, the device camera 628 may be implemented to provide surveillance information related to certain user/device 630 or user/user 670 interactions. In certain embodiments, the surveillance information may be used by the security analytics system 118 to detect anomalous, abnormal, unexpected or malicious behavior associated with an entity, such as user 'A' 602 or user 'B' 672. In certain embodiments, the entity may or may not be aware that the camera is providing such surveillance information.

In certain embodiments, the endpoint device 304 may be used to communicate data through the use of an internal network 644, an external network 646, or a combination thereof. In certain embodiments, the internal network 644 and the external network 646 may include a public network, such as the Internet, a physical private network, a virtual private network (VPN), or any combination thereof. In certain embodiments, the internal network 644 and external network 646 may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/user 670 interactions may include interactions between two or more users, such as user 'A' 602 and 'B' 662. In certain embodiments, the user/user interactions 670 may be physical, such as a face-to-face meeting, via a user/device 630 interaction, a user/network 642 interaction, a user/resource 648 interaction, or some combination thereof. In certain embodiments, the user/user 670 interaction may include a face-to-face verbal exchange. In certain embodiments, the user/user 670 interaction may include a written exchange, such as text written on a sheet of paper. In certain embodiments, the user/user 670 interaction may include a face-to-face exchange of gestures, such as a sign language exchange.

In certain embodiments, temporal event information associated with various user/device 630, user/network 642, user/resource 648, or user/user 670 interactions may be collected and used to provide real-time resolution of the identity of an entity at a particular point in time. Those of skill in the art will recognize that many such examples of user/device 630, user/network 642, user/resource 648, and user/user 670 interactions are possible. Accordingly, the foregoing is not intended to limit the spirit, scope or intent of the invention.

In various embodiments, the security analytics system 118 may be implemented to process certain contextual information in the performance of certain security analytic operations. As used herein, contextual information broadly refers to any information, directly or indirectly, individually or in combination, related to a particular user behavior. In certain embodiments, user behavior may include a user's physical behavior, cyber behavior, or a combination thereof. As likewise used herein, a user's physical behavior broadly refers to any user behavior occurring within a physical realm, such as speaking, gesturing, facial patterns or expressions, walking, and so forth. More particularly, such physical behavior may include any action enacted by a user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be observed through the use of an electronic device (e.g., an electronic sensor), a computing device or system (e.g., an endpoint device 304 or edge device 202, a physical security device 654, a system 656, a shared device 658, etc.), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system 656 at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

In certain embodiments, the contextual information may include location data 636. In certain embodiments, the endpoint device 304 may be configured to receive such location data 636, which is used as a data source for determining the user's location 622. In certain embodiments, the location data 636 may include Global Positioning System (GPS) data provided by a GPS satellite 638. In certain embodiments, the location data 636 may include location data 636 provided by a wireless network, such as from a cellular network tower 640. In certain embodiments (not shown), the location data 636 may include various Internet Protocol (IP) or other network address information assigned to the endpoint device 304 or edge device 202. In certain embodiments (also not shown), the location data 636 may include recognizable structures or physical addresses within a digital image or video recording.

In certain embodiments, the endpoint devices 304 may include an input device (not shown), such as a keypad, magnetic card reader, token interface, biometric sensor, and so forth. In certain embodiments, such endpoint devices 304 may be directly, or indirectly, connected to a particular facility 652, physical security device 654, system 656, or shared device 658. As an example, the endpoint device 304 may be directly connected to an ingress/egress system, such as an electronic lock on a door or an access gate of a parking garage. As another example, the endpoint device 304 may be indirectly connected to a physical security device 654 through a dedicated security network.

In certain embodiments, the security analytics system 118 may be implemented to perform various risk-adaptive protection operations. Risk-adaptive, as used herein, broadly refers to adaptively responding to a risk associated with an electronically-observable user behavior. In various embodiments, the security analytics system 118 may be implemented to perform certain risk-adaptive protection operations by monitoring certain user behaviors, assess the corresponding risk they may represent, individually or in combination, and respond with an associated response. In certain embodiments, such responses may be based upon contextual information, described in greater detail herein, associated with a given user behavior.

In certain embodiments, various risk-adaptive behavior factors 674, likewise described in greater detail herein, may be used to perform the risk-adaptive protection operations. In certain embodiments, the risk-adaptive behavior factors 674 may include user profile attributes 612, user behavior factors 614, user mindset factors 626, or a combination thereof. In these embodiments, the risk-adaptive behavior factors 674 used to perform the risk-adaptive protection operations is a matter of design choice.

In certain embodiments, the security policy generator 120 generates security policies associated with corresponding file format types. In certain embodiments, the security policies may be stored in a security policy datastore 686. In certain embodiments, file format types, file format names, and binary signatures associated with file format types and/or names may be stored in a file format datastore 688. In certain embodiments, the security policies may relate to monitoring and/or responding to activities of files having a particular file format type. In certain embodiments, the security policies relating to files having a particular file format type are generated at the security policy generator 120 and detected at event data detector 910 using the binary signature associated with the file format type. In certain embodiments, the security policies of the security policy datastore 686 include data loss prevention policies. In certain embodiments, the policies of the security policy datastore 686 may be risk-adaptive based on user behavior.

In certain embodiments, the security policies in security policy datastore 686 are deployed to one or more endpoint devices. In certain embodiments, each endpoint agent 306 includes a feature pack 308 having a security policy 914 selected form one or more of the security policies and the security policy datastore 686. In certain embodiments, the security policy 914 is deployed directly from the security policy generator 120. In other embodiments, the security policy 914 is deployed from one or more deployment systems having access to the security policy datastore 686.

In certain embodiments, the security analytics system 118 and security policy generator 120 may be implemented as stand-alone systems. In certain embodiments, the security analytics system 118 and security policy generator 120 may be implemented as a distributed system. In certain embodiment, the security analytics system 118 and security policy generator 120 may be implemented as a virtual system, such as an instantiation of one or more virtual machines (VMs). In certain embodiments, the security analytics system 118 and security policy generator may be implemented as a services 664. In certain embodiments, the services 664 may be implemented in a cloud environment familiar to those of skill in the art. In various embodiments, the security analytics system 118 may use data stored in a repository of security analytics data 680 in the performance of certain security analytics operations. Those of skill in the art will recognize, in view of the present disclosure, that many such embodiments are possible. Accordingly, the foregoing is not intended to limit the spirit, scope or intent of the invention.

Figure 7A:
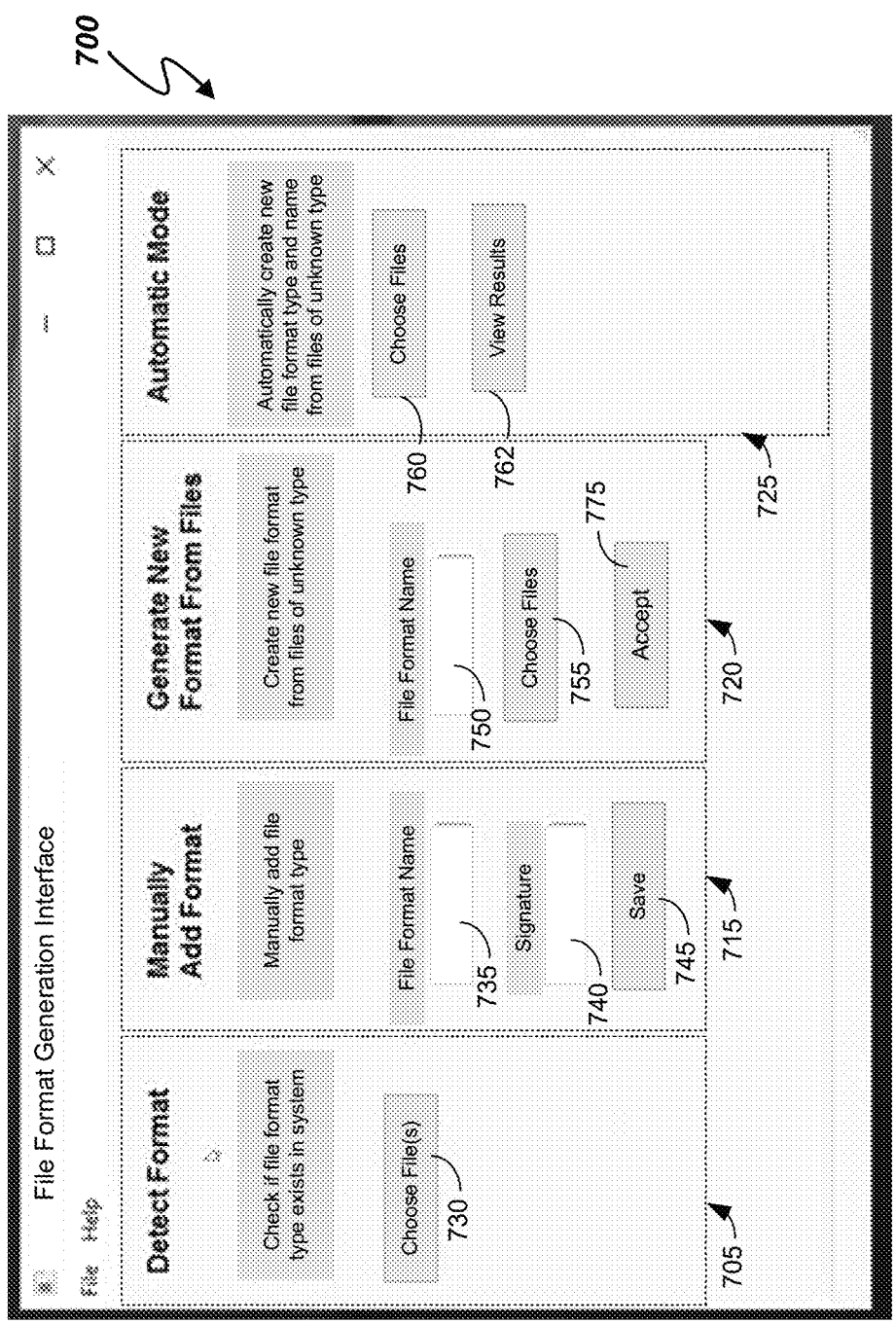
FIGS. 7a and 7b (collectively FIG. 7) depict a user interface that may be used to execute various operations associated with different aspects of file selection and binary signature identification in accordance with certain embodiments of the disclosed system.
Figure 7B:
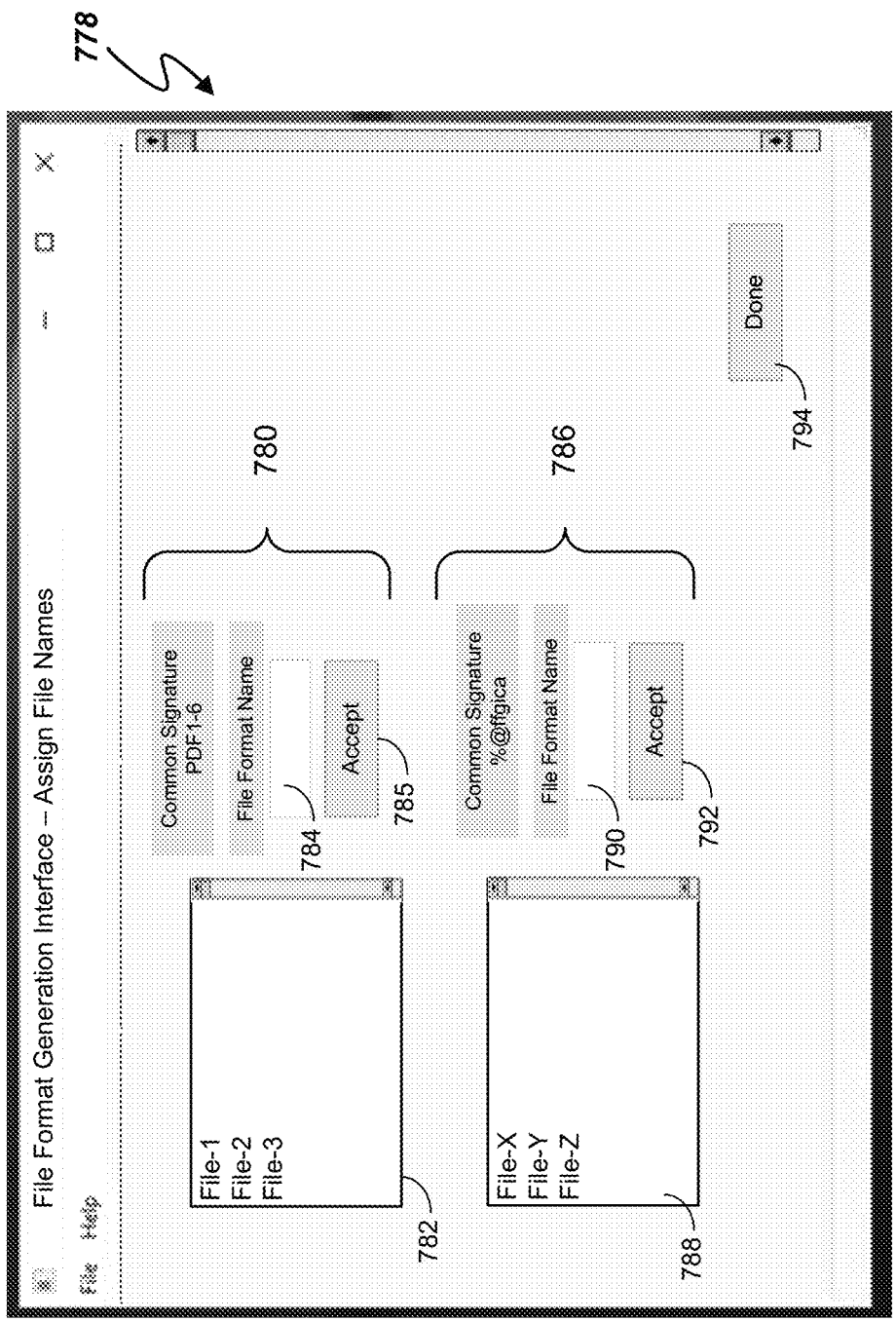

FIGS. 7a and 7b (collectively FIG. 7) depict a user interface that may be used to execute various operations associated with different aspects of file selection and binary signature identification in accordance with certain embodiments of the disclosed system. In the example shown in FIG. 7, a first user interface 700 includes a first region 710 used to detect whether the file format type of a file selected by the user is already available to the security policy generator 120. Such operations may be used to determine the necessity of generating a binary signature for the particular file format type or file format name thereby reducing and/or eliminating the need to engage in unnecessary binary signature identification operations.

Figure 8:
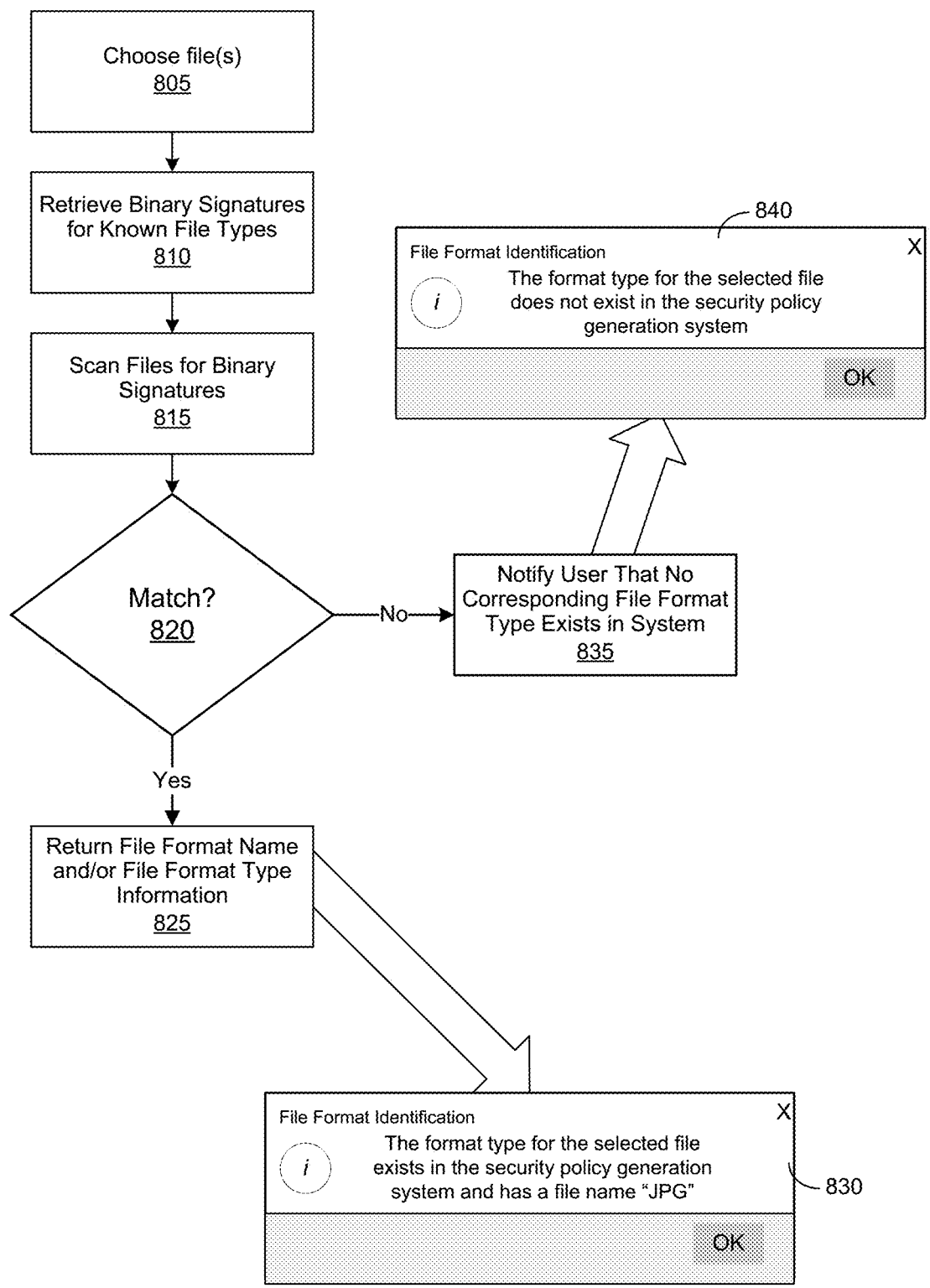
FIG. 8 is a flowchart depicting operations that may be used to determine whether a file format type exists in the security policy generator for files chosen by the user.

FIG. 8 is a flowchart depicting operations that may be used to implement the functionality associated with region 710 of the user interface 700. In certain embodiments, a user interacts with the elements of region 710 to determine whether a file format type exists in the security policy generator with respect to files chosen by the user. In certain embodiments, the user chooses the files at operation 805 by first actuating button 730, which initiates processes for displaying directories and files using, for example, a standard file explorer window known to those in the art. In certain embodiments, the user navigates through the standard file explorer window to choose files for analysis. In certain embodiments, binary signatures for known file format types (e.g., file format types for which binary signatures are already available for use in data loss prevention) are retrieved at operation 815. In certain embodiments, the binary signatures of the files chosen at operation 805 are scanned to identify any binary signatures that are common to the chosen files. In certain embodiments, a check is made at operation 820 to determine whether there is a match between any such common binary signatures and the binary signatures of existing file format types. In certain embodiments, if a binary signature common to the chosen files does not match any of the binary signatures of known file format types, the user is notified that the chosen files do not have a corresponding binary signature at operation 835. One example of such a notification is shown at window 840.

In the illustrated example, if there is a positive match at operation 820, the user is notified that the security policy generator includes or otherwise has access to a binary signature corresponding to the file format type and/or file format name of the chosen files. One example of such a notification is shown at window 830.

Figure 9:
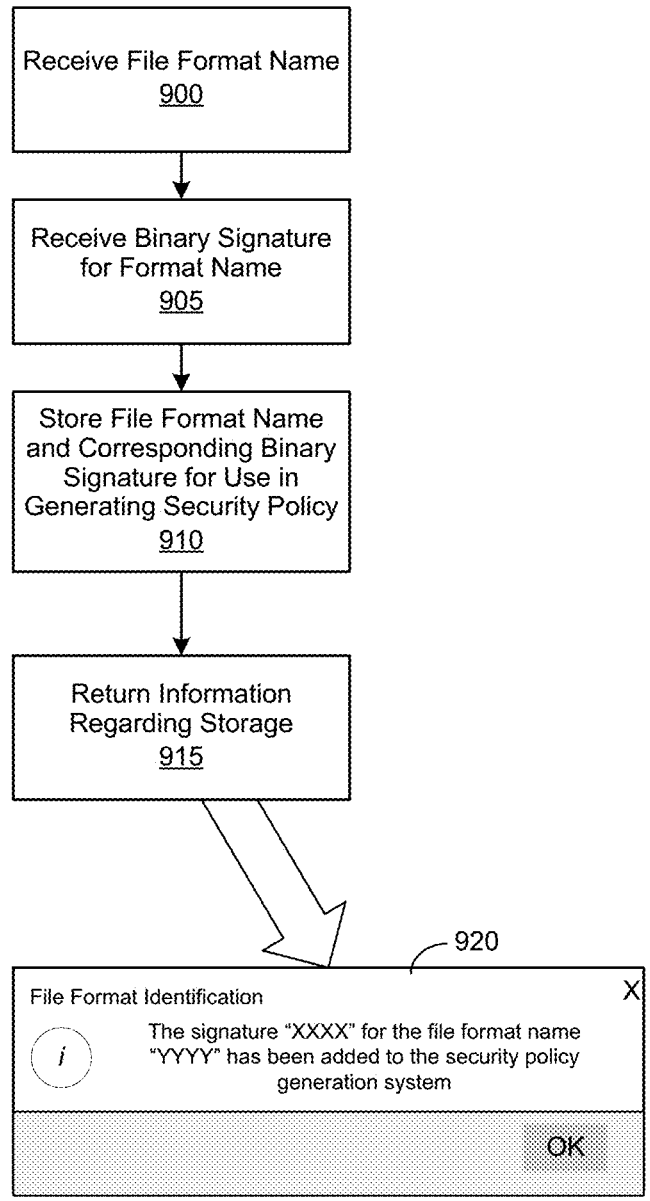
FIG. 9 is a flowchart depicting operations that may be implemented to manually add a file format name and corresponding binary signature to the security policy generator.

FIG. 9 is a flowchart depicting operations that may be used to implement the functionality associated with region 715 of the user interface 705. In certain embodiments, a user interacts with the elements of region 715 to interact with computer executed processes, which manually add a file format name and corresponding binary signature to the security policy generator. In this example, a file format name is received at operation 900. In certain embodiments, the file format name may be entered into text box 735 of region 715. In certain embodiments, the corresponding binary signature for the file format name is received at operation 905. In certain embodiments, the binary signature may be entered into text box 740 of region 715. In certain embodiments, the binary signature may be entered as a hexadecimal number. In the illustrated example, the file format name and binary signature are committed for access by the security policy generator at operation 910. Certain embodiments may commit the storage of the file format name and binary signature in the security policy generator through actuation of the save button 745 in region 715. Once the file format name and binary signature have been committed, the user may be notified of the successful storage at operation 915. One example of such a notification is shown at window 920, indicating that the binary signature "XXXX" (e.g., the value entered into text window 740) for the file format name "YYYY" (e.g., the name entered into text window 735) has been added to the security policy generation system.

Figure 10:
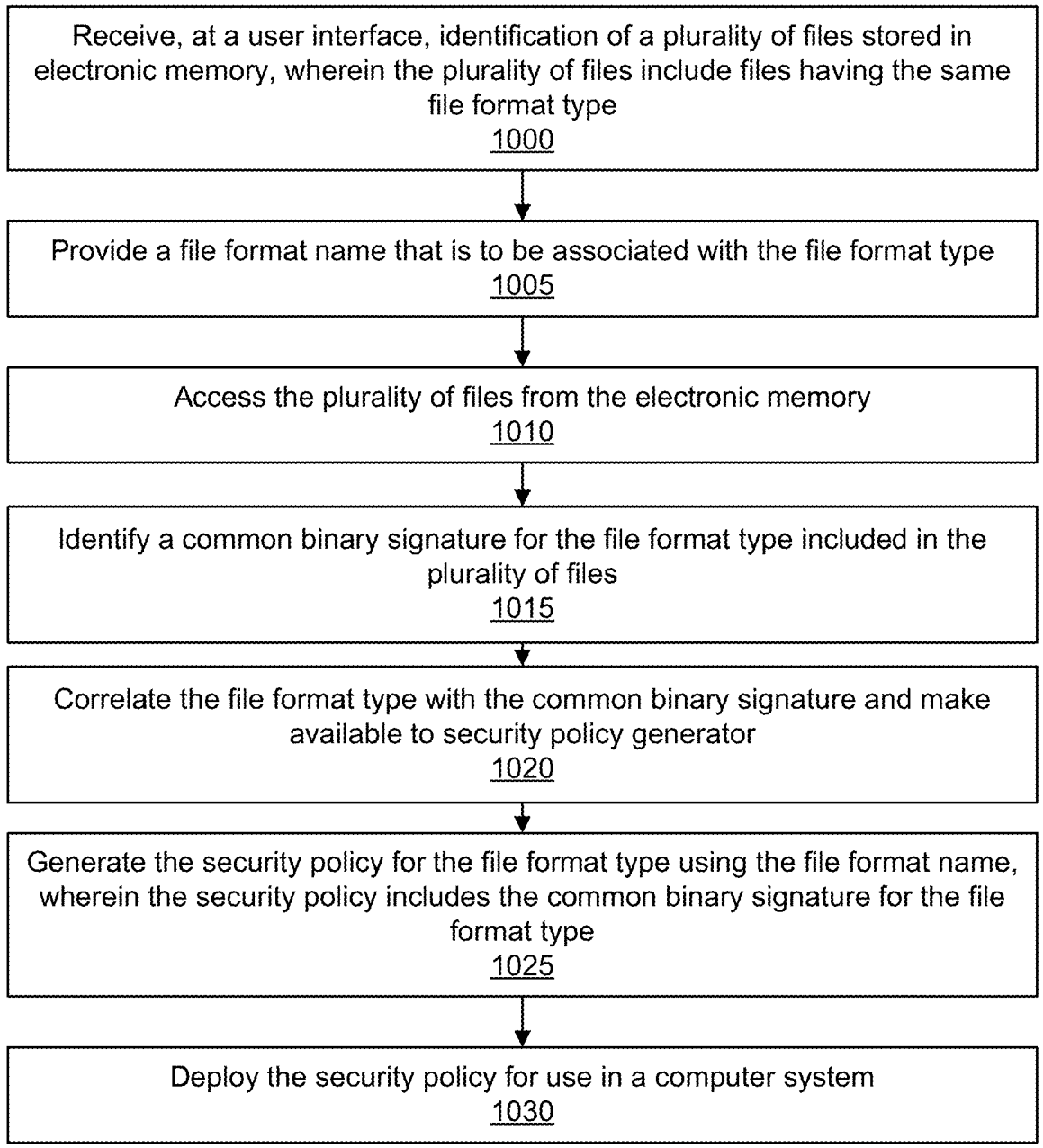
FIG. 10 is a flowchart depicting operations that may be implemented to add a new file format type to the security policy generator based on a set of files chosen by the user.

FIG. 10 is a flowchart depicting operations that may be used to implement the functionality associated with region 720 of the user interface 705. In certain embodiments, a user interacts with the elements of region 720 to engage the computer to add a new file format type to the security policy generator based on a set of files chosen by the user. In certain embodiments, the set of files that are to be analyzed are accessible from electronic memory such as a persistent datastore. In certain embodiments, identification of a plurality of files stored in the electronic memory are received at a user interface at operation 1000 based the choices made by the user. In most instances, at least some files of the set of files identified by the user have files with the same file format type. In some embodiments, a user may engage the computer system to initiate the identification of files that are to be analyzed through actuation of button 755 of region 720. Actuation of the button 755 may invoke a standard operating system file selection interface, such as a file explorer window, which allows the user to analyzed to generate a new file format type.

In certain embodiments, a file format name that is to be associated with the file format type is identified by the user at operation 1005. In certain embodiments, the file format name that is to be associated with the file format type may be entered by the user into text field 750 of region 720. In certain embodiments, the file format name may be automatically generated on one or more common attributes of the plurality of files selected by the user. As an example, common attributes may include a file extension or text identified in one or more of the files.

In the example shown in FIG. 10, the plurality of files selected by the user are accessed from the electronic memory 1010 and then analyzed to identify a common binary signature at operation 1015. In certain embodiments, the file format type is correlated with the common binary signature at operation 1020. In certain embodiments, both the file format type and the file format name are correlated with the binary signature. In certain embodiments, the file format name and/or file format type and corresponding binary signature are stored in persistent memory for subsequent access by the security policy generator.

Once the common binary signature for the selected files has been identified, the file format type and/or file format name may be accessed by the security policy generator to generate a security policy. In certain embodiments, as shown at operation 1015, the security policy for the file format type may be generated using the file format name assigned by the user. In certain embodiments, use of the file format name, as opposed to the file format type, may simplify user interactions with the security policy generator. As an example, it may be easier for a user to generate a security policy using a file format name (e.g., "CAD1-1") that is recognizable and relevant to the security policy for the file format type, than it is to generate a security policy using the file format type (e.g., "ASCD-1-1E"). In certain embodiments, at operation 1025, the user may interact with a user interface to assign particular security actions that are executed when activity relating to a particular file format type occurs. Certain embodiments then generate the security policy to, for example, monitor events relating to the file format name by detecting events that include the common binary signature with which it is associated.

In certain embodiments, the generated security policy is deployed to one or more devices of the computer system for enforcement at operation 1030. Once deployed, the devices of the computer system may detect events having the common binary signature. When events including the common binary signature are detected, the computer system may execute the security actions associated with the file format type/file format name pursuant to enforcing the generated security policy.

Figure 11B:
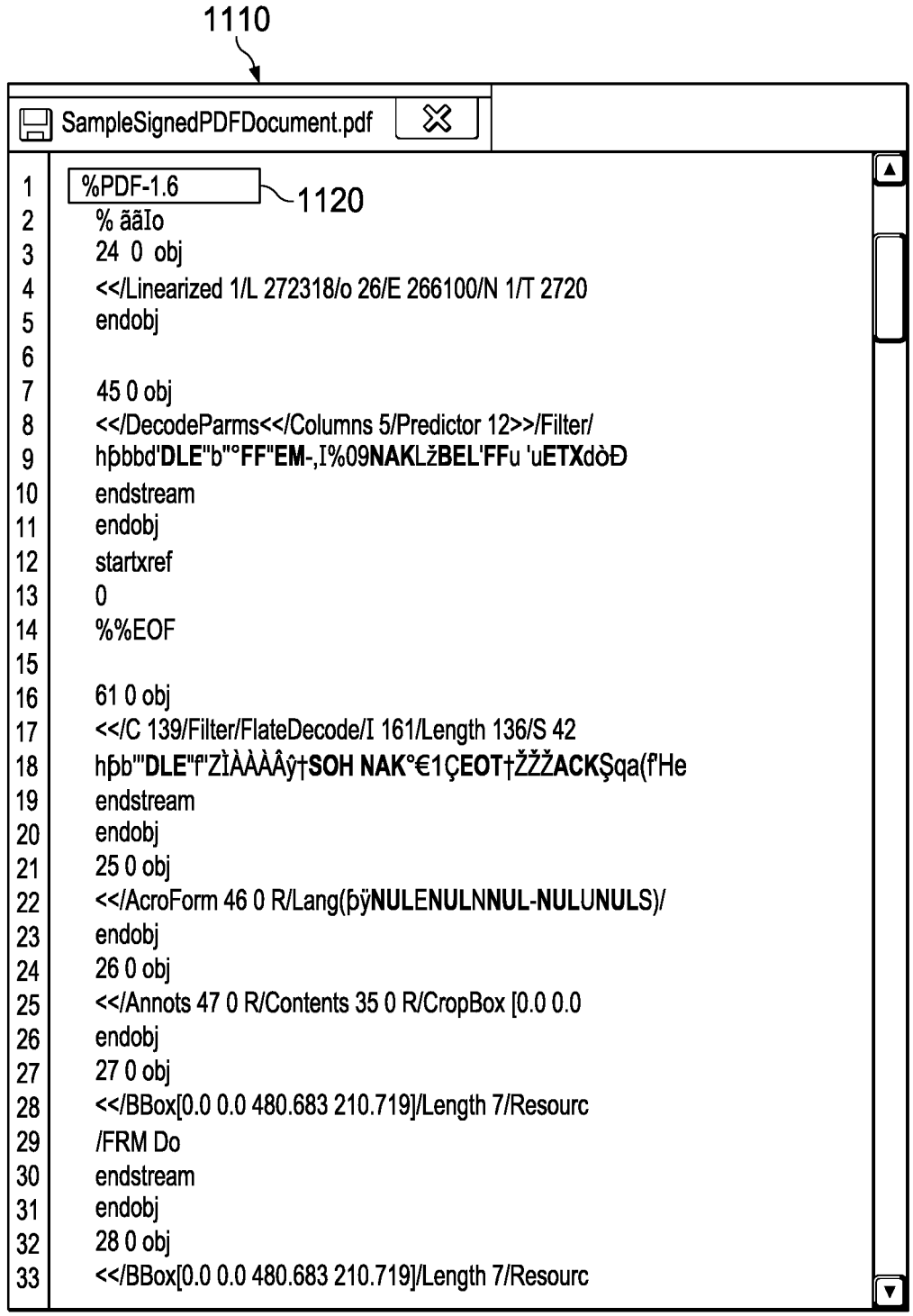
Figure 11C:
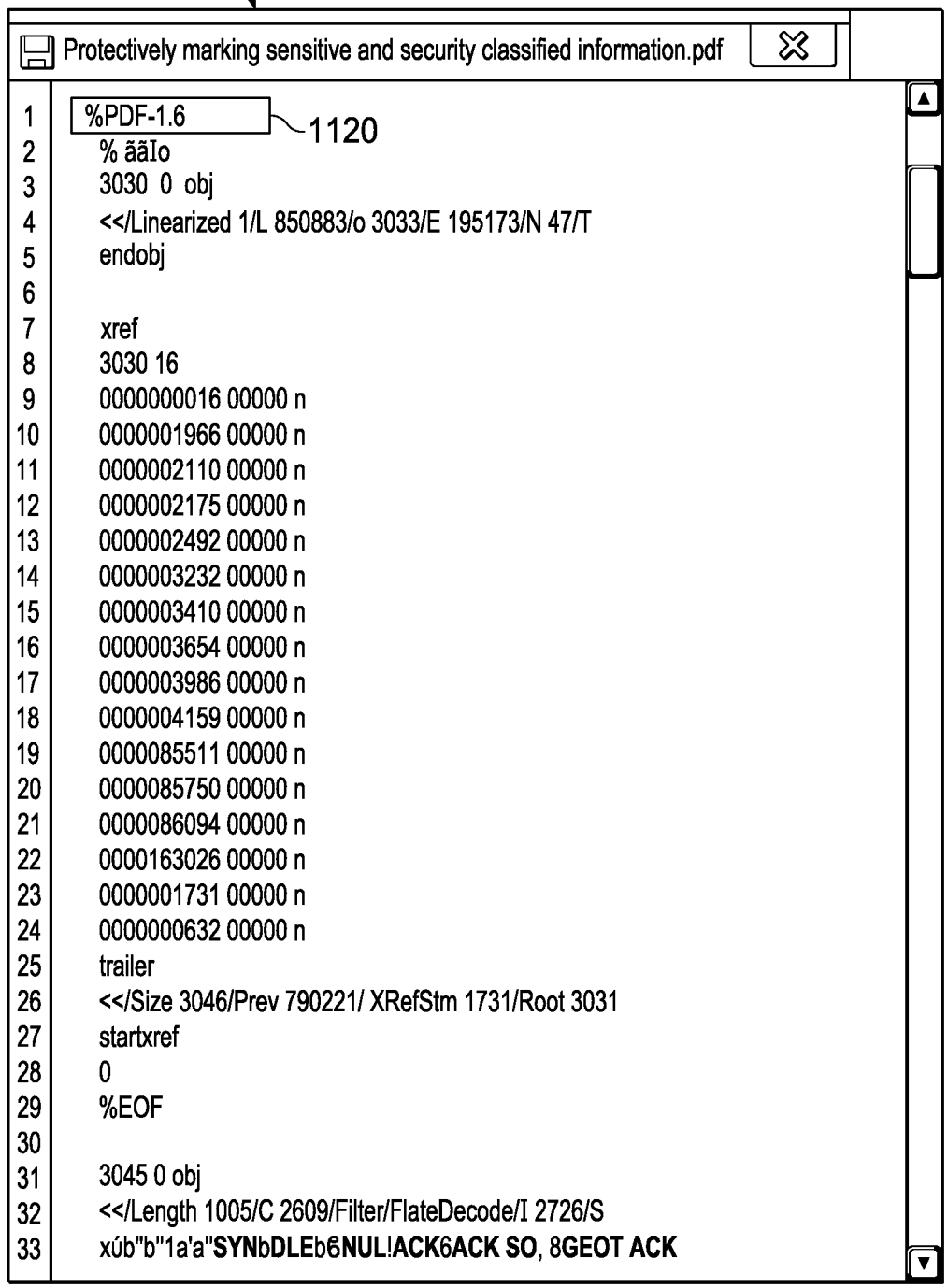

FIGS. 11A, 11B, and 11C, generally referred to herein as FIG. 11, show one example of files having a common binary signature. This particular example shows the content of a first file at 1105, content of a second file at 1110, and content of a third file at 1115, as the content would be displayed, for example, in a text editor. In this example, the binary signature that is common to each of the files has been highlighted at 1120. In certain embodiments, a file format name may be automatically assigned based on common content of the files (e.g., PDF-1.4). In certain embodiments, the file format name may be a name specifically selected by the user that is unrelated to specific content of the selected files. In certain embodiments, the file format name is correlated with the common binary signature, which is shown in text format at 1120 as "PDF-1.6".

Figure 12A:
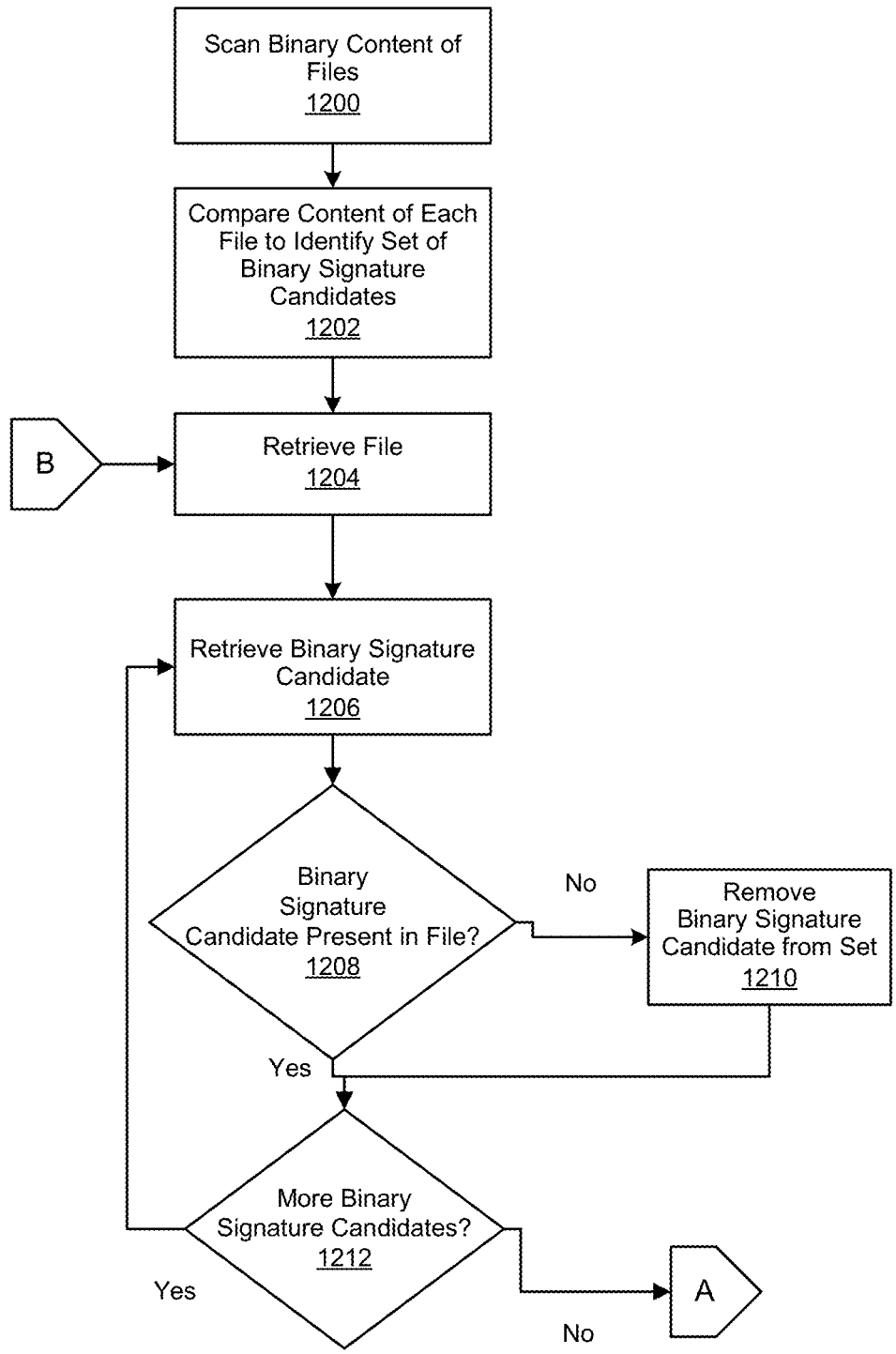
FIGS. 12a and 12b (collectively FIG. 12) is a flowchart depicting exemplary operations that may be used to assign a common binary signature found in a set of files selected by the user to a file format name or file format type.
Figure 12B:
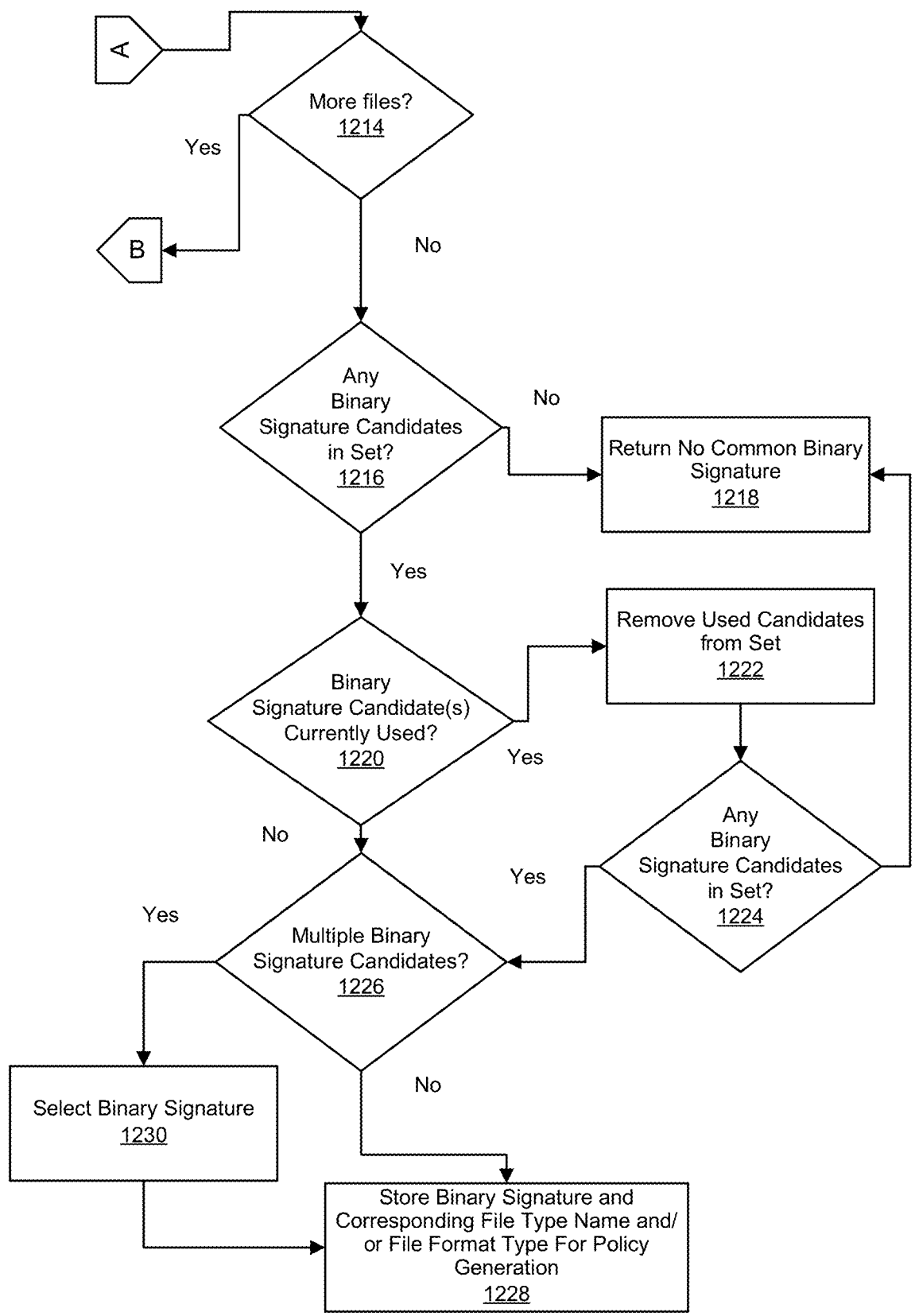

FIGS. 12*a* and 12*b* (collectively FIG. 12) is a flowchart depicting exemplary operations that may be used to assign a common binary signature found in a set of files selected by the user to a file format name or file format type. In certain embodiments, identification begins by scanning the binary content of each of the files selected by the user at operation 1200. In certain embodiments, the contents of each of the scans files are compared with one another to generate a set of binary signature candidates at operation 1202 using binary data that is common to a predetermined threshold number of files. In certain embodiments, the binary data of each selected file is compared against the binary data of every other selected file. In certain embodiments, when the same binary data is common to more than a predetermined number of files (e.g., three or more files), the binary data may be designated as a binary signature candidate. As an example, if the binary data, "F358ED" is found, for example, in three or more files, the binary data may be designated as a binary signature candidate.

Once the binary signature candidates have been identified at operation 1202, certain embodiments analyze the contents of each of the selected files with respect to each binary signature candidate. To this end, certain embodiments analyze the content of each file to determine whether each file includes one or more of the binary signature candidates and thereby remove candidates that are not common to all of the selected files (or, in certain instances, common to a majority of the files). In this regard, certain embodiments retrieve the content of the file at operation 1204 and a binary signature candidate at operation 1206. In certain embodiments, a determination may be made at operation 1208 as to whether the retrieved binary signature candidate is present in the data of file retrieved file. In certain embodiments, the binary signature is removed as a binary signature candidate from the set at operation 1210 if it is not found in the retrieved file. Otherwise, certain embodiments leave the retrieved binary signature in the set of candidates and proceed to analyze the retrieved file using the next binary signature candidate if it is determined at operation 1212 that more binary signature candidates exist in the set. If all binary signature candidates have been analyzed with respect to the retrieved file, certain embodiments make a determination at operation 1214 as to whether there are further files in the set of selected files that need to be analyzed. If more files remain for analysis, the next file may be retrieved at operation 1204 and compared to remaining candidates in the set of binary signature candidates at operations 1206, 1208, 1210, and 1212.

In certain embodiments, a determination may be made at operation 1216 as to whether there are any binary signature candidates remaining in the set of candidates. If there are no common binary signature candidates remaining, the user may be notified that there are no common binary signatures at operation 1218 at, for example, a user interface. If one or more binary signature candidates remain in the set, a determination may be made at operation 1220 as to whether the binary signature candidate is already associated with a file name or file type in or otherwise available to the security policy generator. In certain embodiments, binary signature candidates that are currently associated with the file name or file type are removed from the set of candidates at operation 1222.

In certain instances, the foregoing operations may leave more than one binary signature candidate in the set. Accordingly, certain embodiments make a determination as to whether there are multiple binary signature candidates remain in the set at operation 1226. If so, certain embodiments allow the user to select which binary signature to be used at operation 1230 through, for example, a user interface. In certain embodiments, the binary signature and corresponding file type name and/or file type format is stored for use in policy generation at operation 1228. In those instances in which there is only a single binary signature candidate remaining at operation 1226, that remaining candidate is saved as the binary signature for the file format type at operation 1228.

Figure 13:
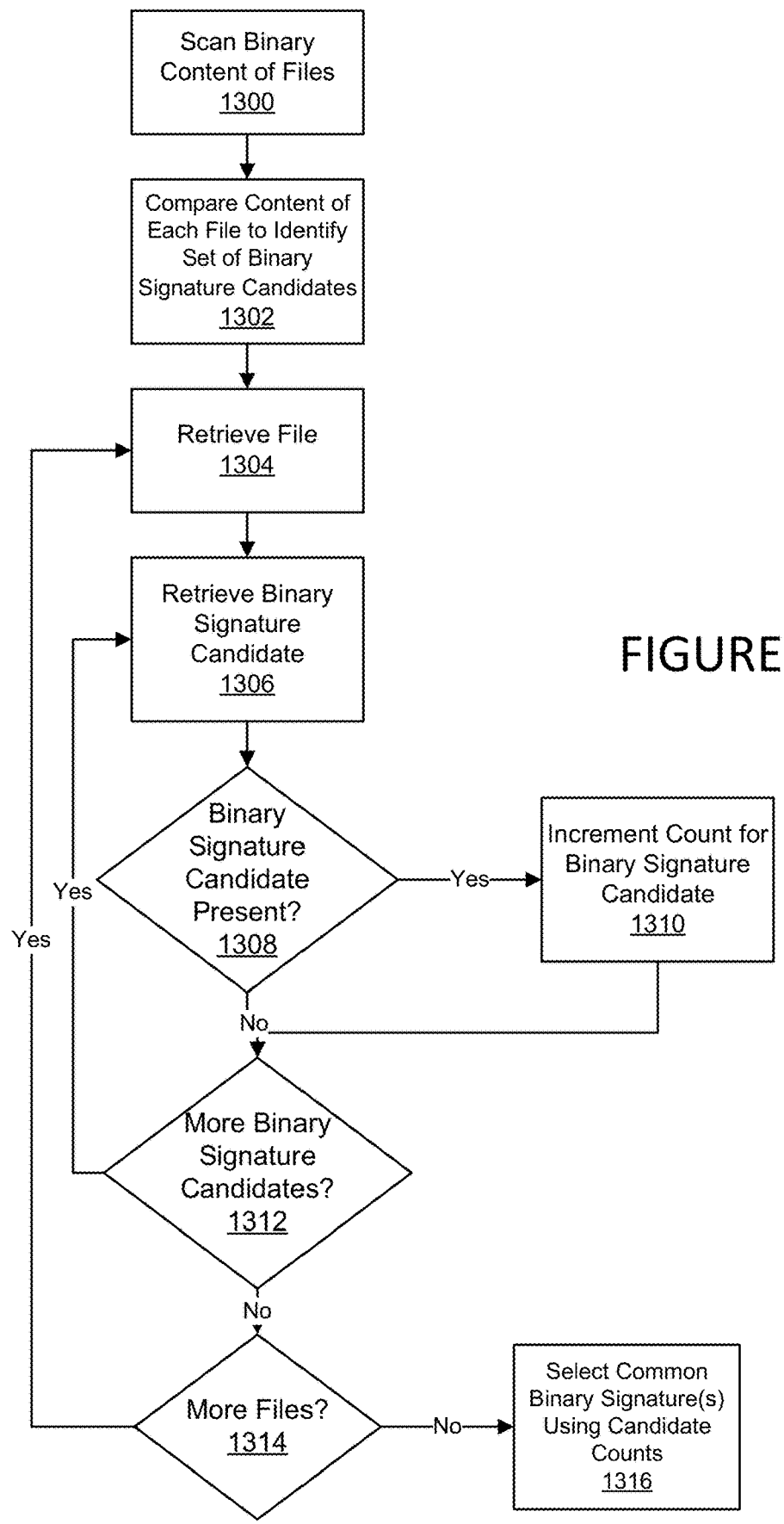
FIG. 13 is another flowchart depicting exemplary operations that may be used to assign a common binary signature found in a set of files selected by the user to a file format name or file format type.

FIG. 13 depicts a flowchart of exemplary operations that may be used to assign a common binary signature found in a set of files selected by the user to a file format name or file format type. In certain embodiments, identification of a binary signature begins by scanning the binary content of each of the files selected by the user at operation 1300. In certain embodiments, a set of binary signature candidates is generated at operation 1302. In certain embodiments, binary data that is common to more than a predetermined number of files may be designated as a binary signature candidate. As an example, if the same binary data is found, for example, in more than three files, the binary data may be designated as a binary signature candidate.

Once the binary signature candidates have been identified at operation 1302, certain embodiments analyze the content of each of the selected files to determine whether it includes one or more of the binary signature candidates. Certain embodiments may retrieve the content of the file at operation 1304 and a binary signature candidate at operation 1306. In certain embodiments, a determination may be made at operation 1308 as to whether the retrieved binary signature candidate is present in the content of retrieved file. In certain embodiments, each binary signature candidate is associated with a corresponding counter. If the binary signature candidate is present in the retrieved file, certain embodiments increment the counter for the binary signature candidate at operation 1310. Whether or not the binary signature candidate is present, a determination is made at operation 1312 as to whether there are more binary signature candidates to be considered with respect to the retrieved file. If all binary signature candidates have been analyzed with respect to the retrieved file, certain embodiments make a determination at operation 1314 as to whether there are further files in the set of selected files that need to be analyzed. If more files remain for analysis, the next file may be retrieved at operation 1304 and compared to remaining candidates in the set of binary signature candidates at operations 1306, 1308, 1310, and 1312 until all files, or substantially all files in the set of selected files, have been analyzed with respect to each binary signature candidate.

Certain embodiments may use the counters respectively associated with each of the binary signature candidates to select which binary signature to use for the corresponding file type format or file format name. In certain embodiments, the binary signature candidate having the largest respective counter value may be selected. In certain embodiments, one or more common binary signatures having the highest counter values may be selected for use with the corresponding file format type or file format name. In certain embodiments, only binary signatures found in a majority of the files are considered, or otherwise selected, for use with the corresponding file format type or file format name.

It will be recognized, based on the teachings of the present disclosure, that the set of common binary signature may be ascertained in a variety of manners. As an example, certain embodiments may combine the binary signature candidate counters used in the flowchart of FIG. 13 with the candidate reduction operations shown in FIG. 12. As an example, a binary signature candidate may be removed from the set if it is not present in any one of the selected files. As a further example, a binary signature candidate may be removed from the set if it has already been assigned to a file format type or file format name in the security policy generator. Therefore, the operations shown in FIG. 12 and FIG. 13 are to be considered examples and are not intended to limit the broadest aspects of this disclosure to specific manners of selecting and assigning binary signature candidates.

Figure 14:
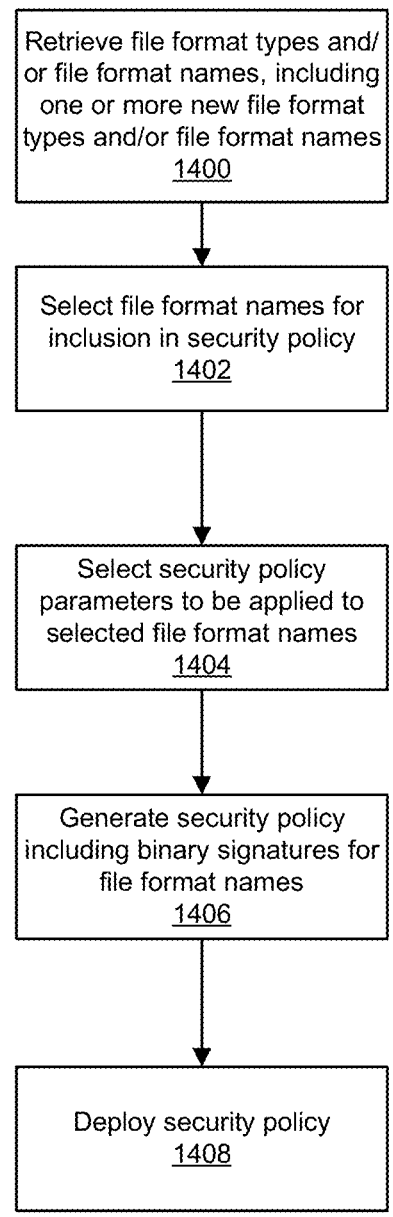
FIG. 14 is a flowchart depicting operations that may be executed to generate and deploy a security policy for a file format type or file format name.

FIG. 14 is a flowchart depicting operations that may be executed to generate and deploy a security policy for a file format type or file format name. In certain embodiments, file format types and/or file format names, including new file format types and file format names added to the security policy generator are retrieved at operation 1400. In certain embodiments, the file format names are presented to a user at a user interface. In certain embodiments, file format names for which a security policy is to be generated are selected by the user at operation 1402. Once the file format names have been selected, certain embodiments allow the user to set the security policy parameters to be applied to file format types having the selected file format name at operation 1404. In certain embodiments, at operation 1406, the security policy is generated using the parameters of operation 1404. In generating the security policy, the binary signatures for the selected file format names are included at operation 1406. Once the security policy has been generated, certain embodiments deploy the security policy at 1408 for enforcement within the computer system. In operation, certain embodiments enforce the deployed security policy upon detection of events having the binary signatures for which the security policy was generated.

Again referencing FIG. 7, display region 725 shows an exemplary interface that may be used in instances in which multiple binary signatures are detected in a set of files chosen by the user. In certain embodiments, the user chooses files for analysis through actuation of button 760. In certain embodiments, the user may actuate button 762 to review the results of the analysis.

One example of an interface that may be invoked to review the results of the analysis is shown at screen 778. The screen 778 of the illustrated example includes a first region 780 displaying a first set of files 782 that have been identified as having a common binary signature. In this example, the system has identified the files as "File-1," "File-2," and "File-3" as having the common binary signature "PDF-1.6". Certain embodiments allow the user to enter a file format name that is to be associated with the common binary signature "PDF-1.6" by entering the desired file format name into text box 784 followed by actuation of the accept button 785.

The screen 778 of the illustrated example also includes a second region 786 associated with a second set of files 788 that the system has identified as having another common binary signature. In this example, the system has identified "File-X", "File-Y", and "File-Z" as having the common binary signature "%@ffgica". Certain embodiments allow the user to enter a file format name that is to be associated with the common binary signature "%@ffgica" by entering the desired file format name into text box 790 followed by actuation of the accept button 792. Once the user has assigned the desired file format names, the user may actuate the done button 794 to commit the common binary signatures and corresponding file format names in the security policy generation system.

In certain embodiments, the file format name may be randomly generated by the security policy generator and displayed in text boxes 784 and 790. In one example, user may accept any automatically generated file format names through actuation of corresponding buttons 785 and/or 792. In certain embodiments, the user may modify or provide a new file format name at text boxes 784 and/or 790. The file format names may be accepted through actuation of corresponding buttons 785 and/or 792, and committed within the security policy generator through actuation of button 794.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implemented method for generating a security policy, comprising:

receiving, at a user interface, identification of a plurality of files stored in electronic memory, wherein the plurality of files includes files having a file format type;

providing a file format name, the file format name being associated with the file format type;

accessing the plurality of files from the electronic memory;

identifying a common binary signature for the file format type included in the plurality of files; and generating the security policy for the file format type using the file format name, the security policy being generated via a security policy generator, wherein the security policy includes the common binary signature for the file format type; and deploying the security policy for use in a protected endpoint, the protected endpoint comprising an endpoint agent in combination with an endpoint device, the security policy being deployed via at least one of directly from the security policy generator and a deployment system having access to a security policy datastore; and wherein the security policy generator is included within a security analytics environment, the security analytics environment comprising a security analytics system, the security analytics system being implemented to perform a risk-adaptive protection operation using the security policy, the risk-adaptive protection operation adaptively responding to a risk associated with an electronically-observable user behavior, a risk-adaptive behavior factor and a user authentication factor being used in performance of the risk-adaptive protection operation;

the user authentication factor comprises a user biometric authentication factor, a token user authentication factor and a user identifier user authentication factor; and, the risk-adaptive behavior factors comprise a user profile attribute factor, a user access insights factor, a user interactions factor, a date/time/frequency factor, a user location factor, a user gesture factor and a user mindset factor.

2. The computer-implemented method of claim 1, further comprising:

using the common binary signature deployed in the security policy to detect occurrences of events relating to files having the file format type.

3. The computer-implemented method of claim 1, wherein identifying the common binary signature comprises:

scanning the plurality of files to detect binary content common to two or more of the plurality of files, wherein the binary content common to two or more of the plurality of files is added to a set of binary signature candidates for the file format name.

4. The computer-implemented method of claim 3, wherein
only binary signature candidates common to a majority of the plurality of files are correlated with the file format name for use as the common binary signature.

5. The computer-implemented method of claim 1, wherein
a single binary signature candidate from a set of binary signature candidates is correlated with the file format name for use as the common binary signature.

6. The computer-implemented method of claim 1, wherein
the file format name is received at the user interface.

7. The computer-implemented method of claim 1, wherein
the file format name is automatically determined based on one or more common attributes of the plurality of files, wherein the common attributes include one or more of a file extension or text identified in two or more of the plurality of files.

8. The computer-implemented method of claim 1, wherein the security policy is deployed to a plurality of endpoint devices.

9. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
receiving, at a user interface, identification of a plurality of files stored in electronic memory, wherein the plurality of files includes files having a file format type;
providing a file format name, the file format name being associated with the file format type
accessing the plurality of files from the electronic memory;
identifying a common binary signature for the file format type included in the plurality of files; and
generating a security policy for the file format type using the file format name, the security policy being generated via a security policy generator, wherein the security policy includes the common binary signature for the file format type; and
deploying the security policy for use in a protected endpoint, the protected endpoint comprising an endpoint agent in combination with an endpoint device, the security policy being deployed via at least one of directly from the security policy generator and a deployment system having access to a security policy datastore; and wherein
the security policy generator is included within a security analytics environment, the security analytics environment comprising a security analytics system, the security analytics system being implemented to perform a risk-adaptive protection operation using the security policy, the risk-adaptive protection operation adaptively responding to a risk associated with an electronically-observable user behavior, a risk-adaptive behavior factor and a user authentication factor being used in performance of the risk-adaptive protection operation;
the user authentication factor comprises a user biometric authentication factor, a token user authentication factor and a user identifier user authentication factor; and,
the risk-adaptive behavior factors comprise a user profile attribute factor, a user access insights factor, a user interactions factor, a date/time/frequency factor, a user location factor, a user gesture factor and a user mindset factor.

10. The system of claim 9, wherein the instructions are further configured for:
using the common binary signature deployed in the security policy to detect occurrences of events relating to files having the file format type.

11. The system of claim 9, wherein identifying the common binary signature comprises:
scanning the plurality of files to detect binary content common to two or more of the plurality of files, wherein the binary content common to two or more of the plurality of files is added to a set of binary signature candidates for the file format name.

12. The system of claim 11, wherein
there are at least three files having the file format type; and,
only binary signature candidates common to a majority of the plurality of files are correlated with the file format name for use as the common binary signature.

13. The system of claim 9, wherein
the file format name is received at the user interface.

14. The system of claim 9, wherein
the file format name is automatically determined based on one or more common attributes of the plurality of files, wherein the common attributes include one or more of a file extension or text identified in two or more of the plurality of files.

15. The system of claim 9 wherein
the security policy is deployed to a plurality of endpoint devices.

16. A non-transitory, computer-readable storage medium embodying computer program code, the computer program code comprising computer executable instructions configured for:
receiving, at a user interface, identification of a plurality of files stored in electronic memory, wherein the plurality of files includes files having a file format type;
providing a file format name, the file format name being associated with the file format type;
accessing the plurality of files from the electronic memory;
identifying a common binary signature for the file format type included in the plurality of files; and
generating a security policy for the file format type using the file format name, the security policy being generated via a security policy generator, wherein the security policy includes the common binary signature for the file format type; and
deploying the security policy for use in a protected endpoint, the protected endpoint comprising an endpoint agent in combination with an endpoint device, the security policy being deployed via at least one of directly from the security policy generator and a deployment system having access to a security policy datastore; and wherein the security policy generator is included within a security analytics environment, the security analytics environment comprising a security analytics system, the security analytics system being implemented to perform a risk-adaptive protection operation using the security policy, the risk-adaptive protection operation adaptively responding to a risk associated with an electronically-observable user behavior, a risk-adaptive behavior factor and a user authentication factor being used in performance of the risk-adaptive protection operation;

the user authentication factor comprises a user biometric authentication factor, a token user authentication factor and a user identifier user authentication factor; and, the risk-adaptive behavior factors comprise a user profile attribute factor, a user access insights factor, a user interactions factor, a date/time/frequency factor, a user location factor, a user gesture factor and a user mindset factor.

17. The non-transitory, computer-readable storage medium of claim 16, wherein the instructions are further configured for:

using the common binary signature deployed in the security policy to detect occurrences of events relating to files having the file format type.

18. The non-transitory, computer-readable storage medium of claim 16, wherein identifying the common binary signature comprises:

scanning the plurality of files to detect binary content common to two or more of the plurality of files, wherein the binary content common to two or more of the plurality of files is added to a set of binary signature candidates for the file format name.

19. The non-transitory, computer-readable storage medium of claim 18, wherein there are at least three files having the file format type; and, only binary signature candidates common to a majority of the plurality of files are correlated with the file format name for use as the common binary signature.

20. The non-transitory, computer-readable storage medium of claim 16, wherein the file format name is automatically determined based on one or more common attributes of the plurality of files, wherein the common attributes include one or more of a file extension or text identified in two or more of the plurality of files.

* * * * *